US011636418B2

(12) United States Patent
Lyerly et al.

(10) Patent No.: US 11,636,418 B2
(45) Date of Patent: Apr. 25, 2023

(54) CURRENCY REDUCTION FOR PREDICTIVE HUMAN RESOURCES SYNCHRONIZATION RECTIFICATION

(71) Applicant: PredictiveHR, Inc., Milton, MA (US)

(72) Inventors: William M. Lyerly, Glenview, IL (US); Charles Occhino, Milton, MA (US)

(73) Assignee: PredictiveHR, Inc., Milton, MA (US)

( * ) Notice: Subject to any disclaimer, the term of this patent is extended or adjusted under 35 U.S.C. 154(b) by 395 days.

(21) Appl. No.: 16/902,944

(22) Filed: Jun. 16, 2020

(65) Prior Publication Data

US 2021/0027250 A1 Jan. 28, 2021

Related U.S. Application Data

(60) Provisional application No. 62/877,698, filed on Jul. 23, 2019.

(51) Int. Cl.

| | |
|---|---|
| *G06Q 10/00* | (2023.01) |
| *G06Q 10/0637* | (2023.01) |
| *G06Q 10/1053* | (2023.01) |
| *G06F 16/23* | (2019.01) |
| *G06F 16/25* | (2019.01) |
| *G06N 20/00* | (2019.01) |
| *G06Q 40/12* | (2023.01) |
| *G06Q 30/0204* | (2023.01) |
| *G06Q 20/38* | (2012.01) |
| *G06N 5/04* | (2023.01) |
| *G06F 18/00* | (2023.01) |

(52) U.S. Cl.
CPC ... *G06Q 10/06375* (2013.01); *G06F 16/2365* (2019.01); *G06F 16/252* (2019.01); *G06F 18/00* (2023.01); *G06N 5/04* (2013.01); *G06N 20/00* (2019.01); *G06Q 10/1053* (2013.01); *G06Q 20/381* (2013.01); *G06Q 30/0205* (2013.01); *G06Q 40/12* (2013.12)

(58) Field of Classification Search
CPC combination set(s) only.
See application file for complete search history.

(56) References Cited

U.S. PATENT DOCUMENTS

| | | | | |
|---|---|---|---|---|
| 7,912,773 | B1 * | 3/2011 | Subramanian | G06Q 30/0202 |
| | | | | 705/35 |
| 8,805,737 | B1 * | 8/2014 | Chen | G06Q 40/00 |
| | | | | 235/380 |
| 9,672,474 | B2 * | 6/2017 | Dirac | G06N 20/00 |
| 10,452,992 | B2 * | 10/2019 | Lee | G06N 20/00 |
| 10,963,810 | B2 * | 3/2021 | Dirac | G06N 20/00 |
| 2009/0254572 | A1 * | 10/2009 | Redlich | G06Q 10/06 |

(Continued)

*Primary Examiner* — Farhan M Syed

(74) *Attorney, Agent, or Firm* — Morse, Barnes-Brown & Pendleton, P.C.; Sean D. Detweiler, Esq.

(57) ABSTRACT

A method and system for repairing data with incongruent or incompatible types that detects anomalies in human resources data, and if anomalies are present in the data, then suggests to a user corrections and synchronizing actions that better match patterns in the data, specifically listing reasons why the data is potentially erroneous and justifies the suggestion based on objective data to aid the user in accepting corrections and synchronizing actions or performing further review and analysis on the data using the method and system.

34 Claims, 9 Drawing Sheets

(56) References Cited

U.S. PATENT DOCUMENTS

| | | | |
|---|---|---|---|
| 2010/0250497 A1* | 9/2010 | Redlich | H04L 63/105 707/661 |
| 2015/0379428 A1* | 12/2015 | Dirac | G06N 20/00 706/12 |
| 2015/0379429 A1* | 12/2015 | Lee | G09B 5/00 706/11 |
| 2015/0379430 A1* | 12/2015 | Dirac | G06N 20/00 706/12 |
| 2017/0236081 A1* | 8/2017 | Grady Smith | G06Q 10/0637 705/7.36 |
| 2018/0040064 A1* | 2/2018 | Grigg | H04L 41/22 |
| 2020/0050968 A1* | 2/2020 | Lee | G06N 20/00 |
| 2020/0394708 A1* | 12/2020 | Cella | H04L 9/0637 |
| 2020/0394709 A1* | 12/2020 | Cella | H04L 9/0637 |
| 2021/0374610 A1* | 12/2021 | Dirac | G06N 20/00 |
| 2022/0172208 A1* | 6/2022 | Cella | G06N 3/049 |

* cited by examiner

CURRENCY REDUCTION FOR PREDICTIVE HUMAN RESOURCES SYNCHRONIZATION RECTIFICATION

RELATED APPLICATIONS

This application claims priority to, and the benefit of, U.S. Provisional Application No. 62/877,698, filed Jul. 23, 2019 for all subject matter contained in said application. The disclosure of said provisional application is hereby incorporated by reference in its entirety.

FIELD OF THE INVENTION

The present invention relates to automated detection, identification, notification, correction, rectification and synchronization of data anomalies and incongruities in datasets and records thereof for users to access and receive updated information compatible for analysis in real time, suitable for datasets including human resources datasets. In particular, the present invention relates to detecting anomalies in human resources datasets, and then, in cases where anomalies in the data are found, the invention then provides notification and suggests rectification actions or measures to remediate said anomalies so as to better match patterns in the data and lists and specifically lists reasons why the data is potentially erroneous and justifies the suggestion for further end-user review.

BACKGROUND

Generally, companies and organizations need to perform analysis on human resources data in order to make decisions. Human resource data, however, is most often not structured in a manner that enables efficient systematic analysis. Prior to this invention there have been heavy investments in manual labor to identify errors and anomalies in human resources data. As an example, this problem is manifested when attempting to use compensation data related to jobs to perform basic analysis. Predictive Human Resources engineers spent time looking at data supplied by companies that details specifications for jobs. There are, however, multiple components associated with a job's compensation (e.g. base amount, benchmark base amount, bonus, benchmark bonus etc.). Data issues arise when conflicting types of currencies are entered into different components of job compensation. The granularity of the data corresponds to one row per job specification. Columns in rows that contain information about compensation. The compensation data can be entered into rows in a manner such that the currency used to denote the compensation does not match the geographic region (i.e. a job in Mumbai is paid in USD).

An example of this would be a job that pays $100,000 base salary but the bonus is listed as EUR 20,000. Not only are the two formats incompatible ($ symbol vs Euro abbreviation), but the currencies listed are also different. To further complicate matters, the office location for the job could be listed as an area that does not use either dollars or euros, such as Mexico City (which uses Mexican Pesos). It must be ascertained which singular currency each job is associated with in order to perform meaningful analysis. Current technology makes it unrealistic to successfully scan thousands of data entries to detect and correct anomalous data.

However, this (technology, device, system, methodology, etc.) experiences some shortcomings. The current methods to find and correct errors in this type of human resources (HR) data fall into two categories. The first is to manually review each record set and compare the record to a paper or fixed record (email) trail. This is a laborious and error prone task. Additionally, there can be errors in the paper trail that cause information about the job to be incorrect. It would be difficult to find this type of error using a paper trail alone. For example, the paper trail for a job could mistakenly indicate that it is to be located in Tokyo, however the job could in fact be based in Singapore. Singaporean recruitment personnel would end up working on the job but downstream systems would indicate that the job is to be paid in YEN. Confusing the matter further is that the bulk of the job's department may be based in the United States. Manually checking the paper trail alone would allow for this error to percolate through because it is technically correct to pay the job in YEN even though the intent was to pay the job in Singapore dollars (SGD). The inventive technology is able to identify this type of error by analyzing the relationships between recruitment personnel working on a particular job along with other variables. The second common method to detect errors in data is through data profiling. Data profiling is a useful tool, but in situations with HR data, where records can be sparsely populated, it is not ideal. For example, it is common for records to be missing a value for currency code. If over 50% of records are missing currency code values, it would be impractical to mark 50% of thousands of records as errant and force an individual manual review. It is also not enough to tell an end user that data is probabilistically erroneous. It takes a significant and inefficient amount of time for the end user to investigate why data is tagged as incorrect. Significant time can be saved if the end user is presented with a list indicating erroneous data along with a corresponding listing of potential reasons why the data is erroneous. This invention minimizes manual labor while increasing the accuracy of the data.

SUMMARY

There is a need for an automated method to identify errant data, including errant currency data, and suggest corrections for the data as well as the reason for a particular correction for schemas involved in processing human resources data. The present invention is directed toward further solutions to address this need, in addition to having other desirable characteristics. Specifically, this inventive technology detects anomalies in human resources data. In cases where it finds anomalies in the data, corrections are suggested that better match patterns in the data and lists and reasons why the data is potentially erroneous are provided with justifications for these suggestions. The end-user can then manually mark jobs as being correct or incorrect. This inventive technology suggests reasons why chosen currency/currencies may be incorrect for a job. This helps give the end user greater confidence in the analysis performed by the inventive system. The system and method also employ techniques evaluating tagging the selected training data as correct and applicable for use in predictive calculations and modeling. The system and method also perform generating of feature sets specific to the source schema data model that efficiently characterizes data for analysis customized to specific sources of data rather than applying problematic generalizations. This practical application of automatic data transformation and management provides many improvements in computing as well as conversion, rectification, synchronization, and correction of datasets including datasets containing human resource data. Automating the identification of probabilistically correct datasets saves time. This inventive technology is able to dynamically select features to be used, which enables it to work with datasets of varying quality and sparsity. It is not sufficient to report to an end user that data is probabilistically erroneous. It takes time for the end user to investigate why data is tagged as incorrect. Time can be saved if the end user is presented a list indicating potential reasons why the data is erroneous, as provided by the technology of the present invention.

In accordance with example embodiments of the present invention, a computer implemented method for automatically detecting and rectifying data anomalies to synchronize human resource datasets is provided. The method includes receiving, using a computing device, raw human resource data from an external source, the raw human resource data including compensation data and storing the received raw human resource data in data storage according to a source data schema; configuring, using a computing device, the raw human resource data stored in data storage according to a source data schema including currency reduction on the compensation data and storing the configured data in data storage; processing, using a computing device, the configured data to determine anomalies in in the compensation data using a machine learning predictive model and storing the results in data storage; and generating and displaying, through a graphical user interface of a computing device, the results of the predictive model indicating anomalies in the compensation data stored in the data storage together with potential reasons for anomalies and suggested correction to rectify and synchronize the data.

In accordance with aspects of the present invention, configuring the raw human resource data includes performing data enrichment on the raw data; performing deep character level inspection on enriched data; extracting numerical data from the enriched data; analyzing the numerical data and performing currency reduction; calculating first level metrics; and transforming currency data and updating data records with transformed data.

In accordance with aspects of the present invention, processing the configured data includes segregating and preparing test datasets and training datasets; generating and evaluating feature sets comprising extracting relevant content from the transformed data; fitting, validating, and testing predictive model; deploying the predictive model and transforming currency data; and calculating second level metrics using model data.

In accordance with aspects of the present invention, the method can perform currency reduction that comprises transforming currency data into a standardized format. The method can create an extract from the raw data comprising rows and columns, stored in data storage comprising at least one database or network of distributed files residing on a plurality of network-based non-transitory storage devices, and creating input variables from relevant content in the raw data, the input variables to be populated into the predictive model storing information in a standardized format. The method can also perform data enrichment of the raw data that maps data fields or records comprising a location or an office to a predefined and populated economic zone that is associated with currencies, which is then stored in data storage.

In accordance with aspects of the present invention, first level metrics can be calculated, comprising performing simple search and count tasks against a source schema, wherein calculation results are stored in data storage.

In accordance with aspects of the present invention, deep character level inspection can inspect each character in a row or column of the enriched data, categorizing each character as a symbol, letter or space, and wherein multiple characters are joined together, and patterns are identified, and results of deep character level inspection are stored in data storage.

In accordance with aspects of the present invention, the method can extract numerical data from the results of deep character level inspection to identify currency symbols and abbreviations in compensation columns, and numerical components that fit patterns representing numbers are identified as currency amounts and stored in data storage. The currency amounts can be converted to a query currency using conversion rates for days closest to a job posting date or open date. The currency amounts are converted to query currency comprising United States Dollars (USD) using conversion rates for days closest to a job posting date or open date.

In accordance with aspects of the present invention, the method can segregate and prepare test datasets and training datasets that comprises training the predictive model using a training dataset selected from the raw data and a test dataset selected from the raw data, wherein training rows comprising the training datasets are marked if currencies in compensation columns and currencies flagged for economic zone column match and then are reduced to a singular value, and wherein test rows comprising the test datasets are marked as all rows that do not fit into training rows.

In accordance with aspects of the present invention, a feature set can comprise a grouping of features, and generating and evaluating feature sets comprises using recursive feature elimination and cross-validation techniques and iterating through and combining features, including non-categorical features and feature groups for categorical features, adding and/or subtracting features in dynamic combinations in a series of loops to form at least one feature set, wherein constraints are placed on a minimum and a maximum number of features and feature groups to contain in a feature set, and outputting a number of feature sets with individual features being ranked with respect to one another within each feature set.

In accordance with aspects of the present invention, the at least one predictive model can further comprise a multiple logistic regression model used to find an equation that best predicts the probability of a value derived from a function of variables indicating predictions for which currencies belong to which job records in the raw data, training dataset and testing dataset. Fitting, validating and testing the at least one predictive model can further comprise training a logistic regression model applying machine learning algorithms to the at least one predictive model and calculating model accuracy wherein feature sets are tested in the at least one predictive model for accuracy with respect to results corresponding to the training datasets to create a hierarchy of one or more candidate models wherein the one or more candidate models that produce a highest level of accuracy using training data of the training datasets are selected for use in the at least one predictive model. Accuracy can be calculated as a ratio of correctly predicted observation to total observations and wherein a currency model with a highest probability is used for a predicted currency of a row singular currency value is set as a correct value for the training dataset which is fed into logistic regression algorithms to output a number of features sets that are individually applied to the logistic regression algorithms using training data for both the test datasets and training datasets. After logistic regression models comprising the at least one predictive model for all relevant currencies have been calculated, the at least one predictive model can be fit with test data of the test dataset and the at least one predictive model is run to identify potential errant rows or records in the raw data and test data of the test dataset, wherein training data and test data are applied using the feature set with the highest level of accuracy to the logistic regression model that calculates the features and creates predictions for which currencies belong to which job records, where anomalous predicted currencies for the test data are identified as differentials between predicted currency of the test dataset and currency used in an economic zone and/or currency code, wherein if currency information is not present for both the economic zone and the currency code, a row is tagged as anomalous.

In accordance with aspects of the present invention, calculating second level metrics using model data can comprises calculations performed against features of the feature sets to explain reasons why anomalous records or jobs were labeled as particular currencies, wherein once calculations are performed on the features sets that were selected to be used with a logistic regression algorithm, wherein second level calculations are used to determine if the predictions made by a logistic regression algorithm yield useable, consistent results, and wherein second level metrics comprise one or more of: detect currency symbols in compensation columns; detect currency abbreviation in compensation columns; job count as related to geography, job specific and recruitment personnel feature groups; average job counts as related to geography, percentile of base USD amount; percentile of the budget bonus USD amount; and combinations thereof.

In accordance with aspects of the present invention, the method can automatically generate and display, to the user, through the graphical user interface of the computing device, results of the predictive model further comprises at least one list indicating instances of erroneous data in the raw data presented to the user using a web page, app or other electronic format jobs are linked to predicted currencies with a corresponding listing of potential reasons why the raw data is erroneous and suggested corrections to rectify the raw data and synchronize the raw data including a notification that justifies the suggested corrections using evidence derived from the raw data and test dataset as well as providing, through a graphical user interface, tools for the user to analyze and review potentially erroneous data and accept suggested corrections or other actions synchronizing data, such that the user can manually decide which anomalous jobs are errors, not-errors or unknown, wherein resultant data can then be reprocessed using the method, with potentially new anomalies being detected and old anomalies being tagged as not being anomalies. The results of the predictive model can further comprise outputting at least one of a numerical score, a graphical format, a Venn diagram, a visual aid and a notification. Presenting or displaying a notification to the user can comprise accessing a table in the data store that has narratives stored and selecting or extracting numbers or values from second level calculations that are inserted into the narratives when thresholds are breached or exceeded, where each narrative of the narratives that is triggered when thresholds are breached or exceeded is inserted and combined into the notification displayed to the user on the graphical user interface with numbers or values inserted into it, for review by the user.

In accordance with example embodiments of the present invention, a systems for automatically detecting and rectifying data anomalies to synchronize datasets is provided, the system includes one or more databases or distributed file systems communicating over an electronic network and configured for data storage, a computing device, and graphical user interface.

The computing device comprising one or more processors, memory, programmable instructions or applications, machine learning algorithm modules calculation engines, and at least one operating system (OS), The computing devices is configured to receive, raw human resource data from an external source, the raw human resource data including compensation data and store the received raw human resource data in data storage according to a source data schema; configure the raw human resource data stored in data storage according to a source data schema including currency reduction on the compensation data and store the configured data in data storage; and process the configured data to determine anomalies in in the compensation data using a machine learning predictive model and storing the results in data storage.

The graphical user interface configured to generate and display the results of the predictive model indicating anomalies in the compensation data stored in the data storage together with potential reasons for anomalies and suggested correction to rectify and synchronize the data.

In accordance with aspects of the present invention, to configure the raw human resource data the computing device performs data enrichment on the raw data; performs deep character level inspection on enriched data; extracts numerical data from the enriched data; analyzes the numerical data and performing currency reduction; calculates first level metrics; and transforms currency data and updates data records with transformed data.

In accordance with aspects of the present invention, to process the configured data the computing device segregates and prepares test datasets and training datasets; generates and evaluates feature sets comprising extracting relevant content from the transformed data; fits, validates, and tests predictive model; deploys the predictive model and transforms currency data; and calculates second level metrics using model data.

In accordance with aspects of the present invention, the system can be further configured to create an extract from the raw data comprising rows and columns, stored in data storage comprising at least one database or network of distributed files residing on a plurality of network-based non-transitory storage devices, and creating input variables from relevant content in the raw data, the input variables to be populated into the predictive model storing information in a standardized format. Data enrichment of the raw data can map data fields or records comprising a location or an office to a predefined and populated economic zone that is associated with currencies, which can then be stored in data storage.

In accordance with aspects of the present invention, first level metrics can calculated by performing simple search and count tasks against a source schema, wherein calculation results are stored in data storage. Deep character level inspection can be performed for each character in a row or column of the enriched data, categorizing each character as a symbol, letter or space, and wherein multiple characters are joined together, and patterns are identified, and results of deep character level inspection are stored in data storage. The system can be further configured to extract numerical data from results of deep character level inspection to identify currency symbols and abbreviations in compensation columns, and numerical components that fit patterns representing numbers are identified as currency amounts and stored in data storage, and wherein the currency amounts are converted to a query currency using conversion rates for days closest to a job posting date or open date. The system can be further configured to use test datasets and training datasets to train the predictive model using a training dataset selected from the raw data and a test dataset selected from the raw data, wherein training rows comprising the training datasets are marked if currencies in compensation columns and currencies flagged for economic zone column match and then are reduced to a singular value, and wherein test rows comprising the test datasets are marked as all rows that do not fit into training rows. A feature set can comprise a grouping of features, and generating and evaluating feature sets comprises using recursive feature elimination and cross-validation techniques and iterating through and combining features, including non-categorical features and feature groups for categorical features, adding and/or subtracting features in dynamic combinations in a series of loops to form at least one feature set, wherein constraints are placed on a minimum and a maximum number of features and feature groups to contain in a feature set, and outputting a number of feature sets with individual features being ranked with respect to one another within each feature set.

In accordance with aspects of the present invention, the at least one predictive model can further comprise a multiple logistic regression model used to find an equation that best predicts the probability of a value derived from a function of variables indicating predictions for which currencies belong to which job records in the raw data, training dataset and testing dataset. The system can be further configured to fit, validate and test the at least one predictive model by training a logistic regression model applying machine learning algorithms to the at least one predictive model and calculating model accuracy wherein feature sets are tested in the at least one predictive model for accuracy with respect to results corresponding to the training datasets to create a hierarchy of one or more candidate models wherein the one or more candidate models that produce a highest level of accuracy using training data of the training datasets are selected for use in the at least one predictive model. Accuracy can be calculated as a ratio of correctly predicted observation to total observations and wherein a currency model with a highest probability is used for a predicted currency of a row singular currency value is set as a correct value for the training dataset which is fed into logistic regression algorithms to output a number of features sets that are individually applied to the logistic regression algorithms using training data for both the test datasets and training datasets. After logistic regression models comprising the at least one predictive model for all relevant currencies have been calculated, the at least one predictive model can be fit with test data of the test dataset and the at least one predictive model is run to identify potential errant rows or records in the raw data and test data of the test dataset, wherein training data and test data are applied using the feature set with the highest level of accuracy to the logistic regression model that calculates the features and creates predictions for which currencies belong to which job records, where anomalous predicted currencies for the test data are identified as differentials between predicted currency of the test dataset and currency used in an economic zone and/or currency code, wherein if currency information is not present for both the economic zone and the currency code, a row is tagged as anomalous.

In accordance with aspects of the present invention, second level metrics can be calculated from calculations performed against features of the feature sets to explain reasons why anomalous records or jobs were labeled as particular currencies, wherein once calculations are performed on the features sets that were selected to be used with a logistic regression algorithm, wherein second level calculations are used to determine if the predictions made by a logistic regression algorithm yield useable, consistent results, and wherein second level metrics comprise one or more of: detect currency symbols in compensation columns; detect currency abbreviation in compensation columns; job count as related to geography, job specific and recruitment personnel feature groups; average job counts as related to geography, percentile of base USD amount; percentile of the budget bonus USD amount; and combinations thereof.

In accordance with aspects of the present invention, the graphical user interface of the computing device can be further configured to automatically generate and present, to the user, results of the predictive model comprising at least one list indicating instances of erroneous data in the raw data presented to the user using a web page, app or other electronic format jobs are linked to predicted currencies with a corresponding listing of potential reasons why the raw data is erroneous and suggested corrections to rectify the raw data and synchronize the raw data including a notification that justifies the suggested corrections using evidence derived from the raw data and test dataset as well as providing, through a graphical user interface, tools for the user to analyze and review potentially erroneous data and accept suggested corrections or other actions synchronizing data, such that the user can manually decide which anomalous jobs are errors, not-errors or unknown, wherein resultant data can then be reprocessed using the method, with potentially new anomalies being detected and old anomalies being tagged as not being anomalies. The graphical user interface of the computing device can be further configured to present, to the user, results of the predictive model comprising output including at least one of a numerical score, a graphical format, a Venn diagram, a visual aid and a notification, wherein a notification to the user comprises accessing a table in the data store that has narratives stored and selecting or extracting numbers or values from second level calculations that are inserted into the narratives when thresholds are breached or exceeded, where each narrative of the narratives that is triggered when thresholds are breached or exceeded is inserted and combined into the notification displayed to the user on the graphical user interface with numbers or values inserted into it, for review by the user.

In accordance with example embodiments of the present invention, a non-transitory computer-readable medium for automatically detecting and rectifying data anomalies to synchronize datasets is provided. The non-transitory computer-readable medium comprising stored electronic instructions that when executed on at least one computing device perform steps including receiving, using a computing device, raw human resource data from an external source, the raw human resource data including compensation data and storing the received raw human resource data in data storage according to a source data schema; configuring, using a computing device, the raw human resource data stored in data storage according to a source data schema including currency reduction on the compensation data and storing the configured data in data storage; processing, using a computing device, the configured data to determine anomalies in in the compensation data using a machine learning predictive model and storing the results in data storage; and generating and displaying, through a graphical user interface of a computing device, the results of the predictive model indicating anomalies in the compensation data stored in the data storage together with potential reasons for anomalies and suggested correction to rectify and synchronize the data.

In accordance with example embodiments of the present invention, a computer implemented method for automatically detecting and rectifying data anomalies to synchronize datasets, comprises receiving, using a computing device, raw data from an external data source, performing data enrichment on the raw data received, performing deep character level inspection on enriched data, extracting numerical data from the enriched data, and analyzing the numerical data and performing currency reduction. The method further includes calculating first level metrics, transforming currency data and updating data records with transformed data; segregating and preparing test datasets and training datasets; generating and evaluating feature sets comprising extracting relevant content from the transformed data. The method further performs fitting, validating and testing at least one predictive model; deploying the predictive model and transforming currency data; calculating second level metrics using model data; and automatically generating and presenting, to a user, through a graphical user interface, results of the predictive model deployed in a displayable format for further end user remediation comprising indicating instances of erroneous data in the raw data together with a corresponding listing of potential reasons why the raw data is erroneous, and suggested corrections to rectify the raw data and synchronize the raw data.

In accordance with example embodiments of the present invention, a system for automatically detecting and rectifying data anomalies to synchronize datasets includes one or more databases or distributed file systems communicating over an electronic network and configured for data storage. The electronic network connects also to a computing device comprising one or more processors, memory, programmable instructions or applications, machine learning algorithm modules calculation engines, and at least one operating system (OS). The computing device is configured to, receive raw data from an external data source; perform data enrichment on the raw data received; perform deep character level inspection on enriched data; extract numerical data from the enriched data; and analyze the numerical data and perform currency reduction. The computing device is configured to calculate first level metrics; transform currency data and updating data records with transformed data; segregate and prepare test datasets and training datasets; and generate and evaluate feature sets comprising extracting relevant content from the transformed data. The computing device is also configured to fit, validate and test at least one predictive model; deploy the predictive model to transform currency data; and calculate second level metrics using model data.

A graphical user interface is configured to automatically generate and present, to a user, results of the predictive model deployed in a displayable format for further end user remediation comprising a list indicating instances of erroneous data in the raw data together with a corresponding listing of potential reasons why the raw data is erroneous, and suggested corrections to rectify the raw data and synchronize the raw data.

In accordance with example embodiments of the present invention, a non-transitory computer-readable medium for automatically detecting and rectifying data anomalies to synchronize datasets, the non-transitory computer-readable medium comprising stored electronic instructions that when executed on at least one computing device perform steps comprising receiving, using the at least one computing device, raw data from a data source; performing data enrichment on the raw data received; performing deep character level inspection on enriched data; extracting numerical data from the enriched data; and analyzing the numerical data and performing currency reduction. The computer-readable medium is configured to perform calculating first level metrics; transforming currency data and updating data records with transformed data; segregating and preparing test datasets and training datasets; and generating and evaluating feature sets comprising extracting relevant content from the transformed data. The computer-readable medium further is configured to perform fitting, validating and testing at least one predictive model; deploying the predictive model and transforming currency data; and calculating second level metrics using model data. A graphical user interface is further programmed to automatically generate and present, to a user, through a graphical user interface, results of the predictive model deployed in a displayable format for further end user remediation comprising a list indicating instances of erroneous data in the raw data together with a corresponding listing of potential reasons why the raw data is erroneous, and suggested corrections to rectify the raw data and synchronize the raw data.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
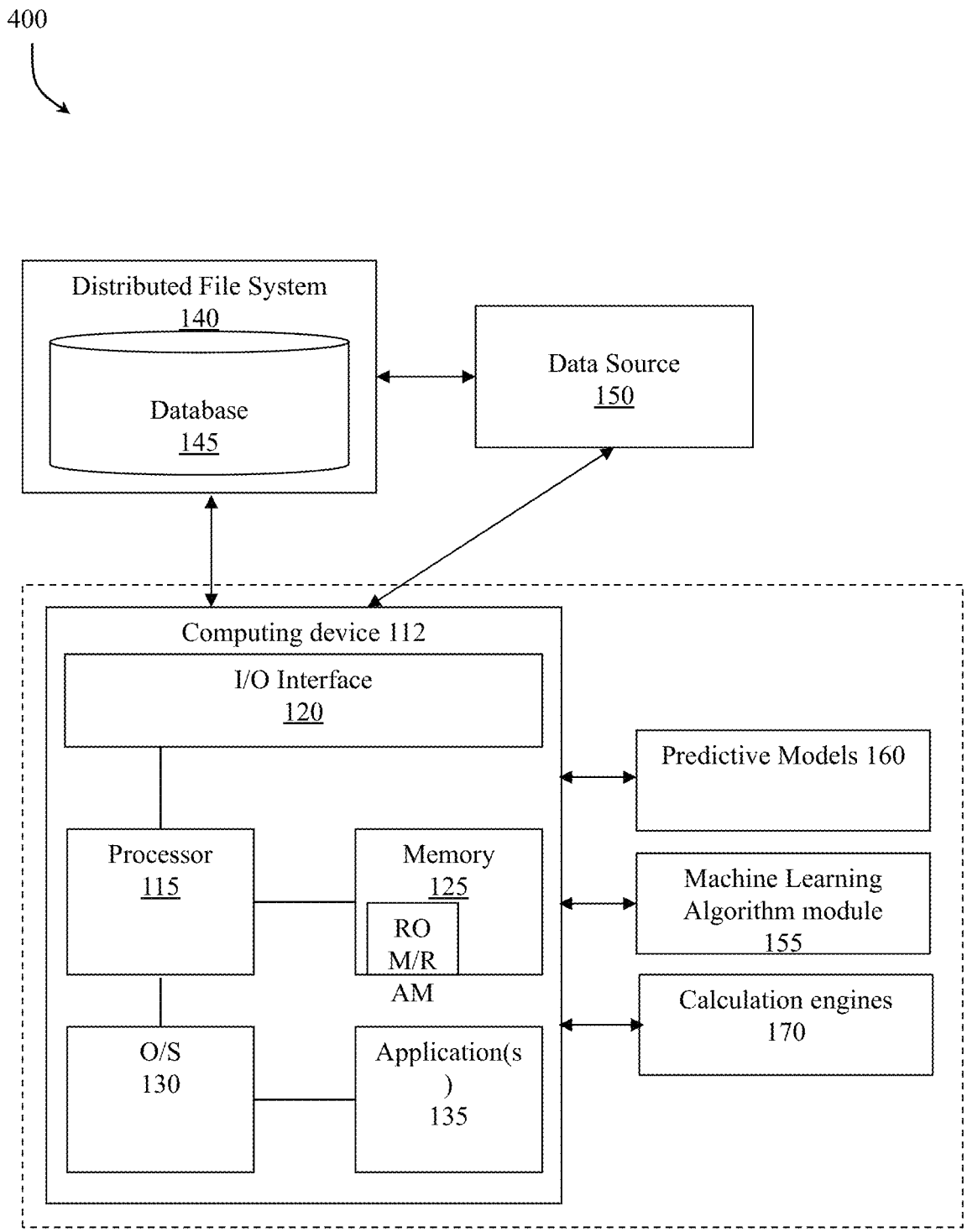
FIG. 1 is an illustrative computing environment for implementing the invention in accordance with the aspects of the invention.

An illustrative embodiment of the present invention relates to computer implemented methods, systems, and non-transitory computer readable media for automated detection, identification, notification, correction, rectification and synchronization of data anomalies and incongruities in datasets and records thereof, including detecting anomalies in human resources data, wherein when anomalies in the data are detected, the invention suggests and displays corrections that better match patterns in the data, specifically listing reasons why the data is potentially erroneous and justifies the suggestion with verifiable data evidence as well as providing, through a graphical user interface, tools for end users to analyze and review potentially erroneous data and accept corrections to the data or other actions synchronizing the data for further processing and analysis.

FIGS. 1 through 9, wherein like parts are designated by like reference numerals throughout, illustrate an example embodiment or embodiments of computer implemented methods, systems, and non-transitory computer readable media for automatically detecting and rectifying data anomalies to synchronize datasets, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

FIG. 1 depicts an illustrative computing environment for implementing the invention in accordance with the aspects of the invention. The system 400 comprises a data source 150, one or more databases 145, distributed file systems 140 or other networked data storage, one or more computing devices 112, one or more processors 115, input/output (I/O) interfaces 120, memory 125, applications 135, predictive models 160, machine learning algorithm modules 155, calculation engines 170, and at least one operating system (OS) 130. The system 400 of FIG. 1 is used to implement the present invention of including receiving, using a computing device, raw human resource data and storing the received raw human resource data in data storage according to a source data schema; configuring the raw human resource data stored in data including currency reduction on the compensation data and storing the configured data in data storage; processing the configured data to determine anomalies in in the compensation data using a machine learning predictive model and storing the results in data storage; and generating and displaying, through a graphical user interface, the results of the predictive model indicating anomalies in the compensation data stored in the data storage together with potential reasons for anomalies and suggested correction to rectify and synchronize the data.

Figure 2:
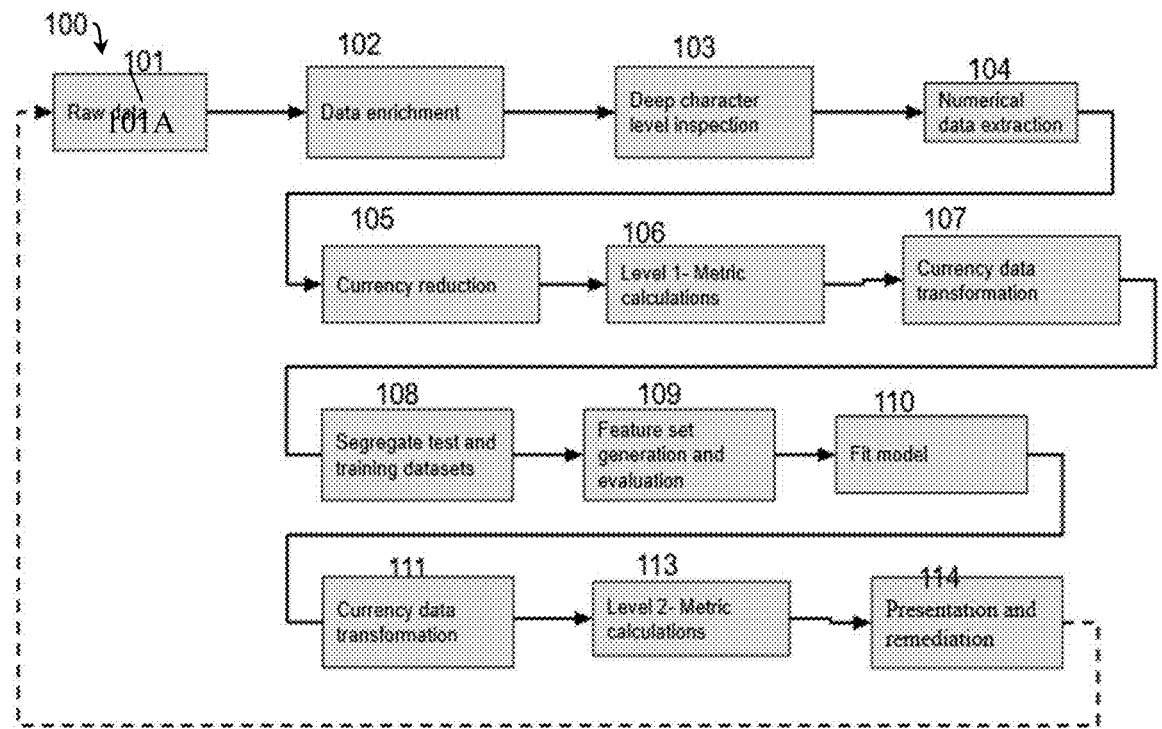
FIG. 2 is an illustrative flowchart depicting the process for identifying, rectifying and synchronizing data and presenting data anomalies, in accordance with aspects of the invention.

FIG. 2 shows an example flow chart depicting implementation of the present invention. Specifically, FIG. 2 depicts an example flow chart showing the operation of the system 400, as discussed with respect to FIG. 1. In particular, FIG. 2 depicts a process or method 100 for using data from a data source 150 to calculate the job compensation and currency reduction, detecting anomalies in data and display or presenting predicted incorrect currency fields, records, or rows to the user in accordance with the system 400 and method 100 of the present invention.

At step 101, the computing device 112 of the system 400 receives aggregated or other raw data 101A from the data source 150. For example, the computing device 112 may request a raw data 101A feed for a particular dataset, individual or group of individuals from the data source 150.

In this example, the raw data is configured in steps 102 through At step 102, the computing device 112 performs data ingestion of the data feed of raw data 101A and performs data enrichment on the raw data 101A dataset. The received raw data 101A feed can include data obtained from human resources files, human resources records, other employment records or social media profile(s) resulting from a number of methods utilized by the data source 150. For example, the data source 150 can obtain data from sources internal to the data source 150 and transmit that data over an electronic network to the computing device 112 or a database or distributed file system used by the computing device 112 as data storage. As would be appreciated by one skilled in the art, the computing device 112 and the data storage can comprise a number of different computers or computing devices locally or remotely connected to perform the necessary functions of the system 400. As would be appreciated by one skilled in the art, data ingestion can include, importing, processing, standardizing formats and/or storing the raw data 101A feeds for later use. For example, the raw data 101A feeds can be stored locally on the computing device 112 or on a database (e.g., a database 145). Data enrichment on the raw data 101A dataset can include mapping location or office entries to a predefined automatically or manually populated economic zone that is associated with particular currencies. At step 103, the deep character inspection. As would be appreciated by one skilled in the art, the method 100 can employ several different tools for character recognition or string identification. For example, every character in a row and column can be inspected. Each character can be categorized as a symbol, letter or space. Multiple characters are then joined together, and patterns are identified. The results of the inspection can be stored in data storage and the computing device 112 can transform the raw data 101A included in the data feeds into a format optimized for the machine learning algorithms or other analysis algorithms used in accordance with the system and method of the present invention.

At step 104, the numerical data extraction uses the results of the deep character level inspection to identify currency symbols and abbreviations in the columns of data including compensation columns. Numerical components that fit patterns representing numbers are identified as currency amounts. At step 105, currency reduction is performed to align identified currency amounts into standardized formats for further analysis. At step 106, the first level or level 1 metric calculations are performed, including but not limited to search and count tasks performed against the source schema 200, where the results are stored in data storage. At step 107, the computing device 112 performs currency data transformation to convert currency amounts into query currency or singular currency, to standardize and normalize the data for comparison and calculation that is efficient and compatible.

In this example, the configured data is processed in steps 108 through 113. At step 108, the computing device 112 segregates test datasets and training datasets from the raw data 101A, enriched data, or transformed data, using selection based on set parameters of the system 400. At step 109, the computing device 112 performs feature set generation and evaluation. At step 110 fitting of the model is performed, wherein the model may be at least one predictive model, that may in turn be a currency model, candidate model, or individual logistic regression model including a multiple logistic regression model. At step 111, the currency data transformation is performed to implement the model. At step 113, the second level or level 2 metric calculations are completed to evaluate the features sets that were selected to be used with the logistic regression algorithm or similar algorithm of the model.

At step 114, the method 100 performs presentation and remediation where results of the processing are presented to the user through a web page, app or other electronic form. Jobs are linked to predicted currencies, and an end user can manually review and decide which anomalous jobs are errors, not-errors or unknown. The data can then be reprocessed with potentially new anomalies being detected and old anomalies being tagged as not being anomalies.

Table 1000 below describes the major components of the invention. All results of these processes are stored in storage.

dictionary for source data 200 before beginning processing. In one example embodiment, the column names in the source data 200 are used to perform calculations. In other words the data that this system uses must conform to the source data model (see, Table 2000). If it does not, the invention will not work as expected.

Figure 5:
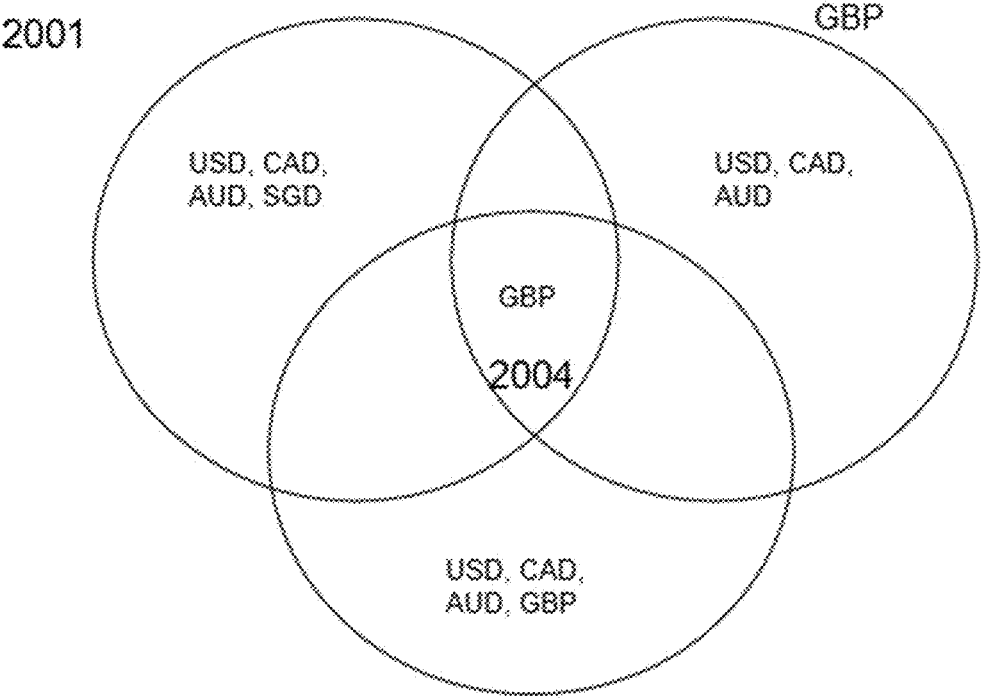
FIG. 5 is an illustrative currency reduction Venn diagram that shows the logic of how multiple currencies across differing features reduce to a singular currency.

The data can be enriched in two important ways: by manually confirming anomalous data is correct or incorrect (see FIG. 8); and by mapping the office data to predefined economic zones (see FIG. 5).

TABLE 1000

| Item | Description |
| --- | --- |
| Raw data extract | An extract is made and placed in storage. It contains rows and columns. |
| Data enrichment | Maps the office to a predefined manually populated economic zone that is associated with currencies |
| Level 1 - Metrics Calculations | A process that performs simple search and count tasks against the source schema (200). The results of the inspection are stored in storage. |
| Deep character level inspection | Every character in a row and column is inspected. Each character is categorized as a symbol, letter or space. Multiple characters are pieced together, and patterns are identified. The results of the inspection are stored in storage. |
| Numerical data extraction | Uses the results of the deep character level inspection process to identify currency symbols and abbreviations in the compensation columns. Numerical components that fit patterns representing numbers are identified as currency amounts. |
| Currency data transformation | Currency amounts are converted to USD using conversion rates for days closest to the date that the job was posted (Open Date). |
| Segregate test and training datasets | Training rows are marked if currencies in the compensation columns and the currencies flagged for economic zone column match and are reduced to a singular value. Test rows are marked as all rows that do not fit into training rows. |
| Feature set generation and evaluation | A feature set is a grouping of features. This process generates feature sets. The process iterates through and combines features, adding and subtracting them. The output of this process are a number of features sets with individual features being ranked with respect to one another within each feature set. |
| Model accuracy calculations | Feature sets are tested in the training model (900) for accuracy (9000). The models that produce the most accuracy using the training data are selected. |
| Fit model | The model is fit with the test data. The model identifies potential errant rows in the data. FIG. 500 |
| Level 2- Metric Calculations | Calculations are performed against the features to explain the reasons why anomalous jobs were labeled particular currencies. Calculations are performed on the features sets that were selected to be used with the Logistic Regression algorithm, no other feature sets are used. Samples of level 2 metrics are in the FIG. (6000). |
| Presentation and remediation. | The results of the processing are presented to the user through a web page, app or other electronic form. Jobs are linked to predicted currencies. The user can manually decide which anomalous jobs are error, not-error or unknown. The data can then be reprocessed with potentially new anomalies being detected and old anomalies being tagged as not being anomalies. |

In operation, raw data 101A is extracted from the source system and placed into storage, with the data being organized to include columns and rows to roughly conform with the Source Data Schema 200 although fewer or greater number(s) of columns of information may be present. The raw HR dataset used comes from various data sources including a data source corresponding to one or more client entities. The raw HR dataset should conform to the data Note, base amount, benchmark base amount, bonus, and benchmark bonus all are sent to by the client from the data source 150. These variables contain historical data.

Table 2000—Source Data Schema—represents the schema used as an input into the system. It is comprised of rows and columns.

TABLE 2000

| Column | Description | Category |
| --- | --- | --- |
| Unique Row Identifier | The unique id associated with the Job | Processing |
| Budget Bonus | The amount of bonus a job can receive over the course of a year. | Compensation |
| Benchmark Base | The metric used to compare the base salary amount to in order to justify the salary. | Compensation |

TABLE 2000-continued

| Column | Description | Category |
|---|---|---|
| Benchmark Bonus | The metric used to compare the bonus component of the salary amount to in order to justify the bonus. | Compensation |
| Benchmark Data | Free flowing text column. Explains the method used to justify the base and/or bonus amounts | Compensation |
| Office | Where the job is located for a job. Can be a city, region (N. America), country or economic zone (EU). | Geographical |
| Hiring Manager | The employee who requested a new position to be filled | Recruitment Personnel |
| Primary Recruiter | The employee that manages the requisition and all candidates who apply | Recruitment Personnel |
| Secondary Recruiters | The employee that helps manage the requisition and all candidates who apply | Recruitment Personnel |
| Primary Coordinator | The employee that coordinates the interviews between the hiring manager (s) and candidate. | Recruitment Personnel |
| Secondary Coordinators | The employee who backs up the Primary Coordinator | Recruitment Personnel |
| Sources | This employee who verifies that the candidate resume is up to date and that the candidate would be interested in interviewing (that's it) | Recruitment Personnel |
| Default offer approvers | The employee who approves large offers. | Recruitment Personnel |
| Job Approvers: Start Recruiting | The approval of usually a department head of finance to open up a requisition for a position for medium and below size offers. | Recruitment Personnel |
| Currency Code | The currency that the job is to be compensated in. | Job specific |
| Level | The seniority of the position | Job specific |
| Organization | | Job specific |
| Job | The description of the job | Job specific |
| Department | The department that the job is in. | Job specific |
| Open Date | The date that the job was opened up for applications | Job specific |

The data enrichment process scans through component of the schema 200 detailing information about office and maps the office data to predefined manually populated economic zone data that is associated with currencies (ex. Jobs with a specified office in London are in the UK and thus uses the Pound currency which is abbreviated with GBP and uses the £ symbol). It is possible to have an office location for a job be associated with more than one currency. The one to many relationships between office and economic zone is such that an office location can be in either the Brussels or London which are in the UK and the EU respectively. In this case the possible abbreviations associated with the job are GBP and EUR while the symbols are £ and €.

The deep character level inspection process 103 initiates processing. Every character in rows and columns associated with compensation are inspected. Each character is categorized as a symbol, letter or space. Multiple characters are pieced together; patterns are identified with spaces and the first and last characters in strings identifying the endpoints for substrings. The process is specifically configured to scan for currency symbols, numerical amounts and currency abbreviations. For example, the following string representing data in the 'budget base' column: INR $900,000.0 would be parsed so that it creates three individual substrings: substring-1=INR, substring-2=$, substring-3=900,000 each associated with the job and column. The results of the inspection are stored in storage.

The numerical data extraction process begins processing. It uses substring string data from the deep character level inspection process to look at numerical data. This process attempts to fit the numerical data into amounts taking special care to determine the meaning of placement of comas and periods using rules (if there are exactly two numbers to the right of the period that portion of the string represents fractions of the currency whereas if there are exactly three numbers to the right of the period the period represents thousands). The results are stored in storage. For example, consider the following situation:

800,000.32 is resolved to 800000.32 and 9000.43 is unchanged 800.000 is resolved to 800000).

The deep character level inspection uses a series of rules to identify patterns in data using delimiters (start of line, end of line, space, beginning of character sequence, beginning/end of numeric sequences, new lines) to make decisions about data. Here are some examples:

In column Benchmark Base (see, Table 2000) there is the following entry→"INR6543". The deep character inspection process would recognize that the currency is Indian Rupees with an associated amount of 6543. The process can recognize currency symbols and numbers.

In column Benchmark Base (see, Table 2000) there is the following entry→"inroad 56546". The deep character inspection process would not recognize that Rupees even though there is a character string that has "inr" in it because there is no delimiting character. It would however recognize the amount 56546.

In column Benchmark Base (see, Table 2000) there is the following entry→"inr 56546 345452". The deep character inspection process would recognize Rupees as the currency but would not register an associated amount because there is more than one numerical entry.

The deep character level inspection may be performed using various techniques known to one of ordinary skill in the art, including ranking techniques. In one example embodiment, deep character level inspection is performed wherein feature groups are assembled into feature sets 5001 in an iterative manner, paying heed to the following thresholds for (see, Table 5000): Maximum number of feature groups and non-categorical features; Minimum number of feature groups and non-categorical features; and Required features in feature groups.

Figure 3:
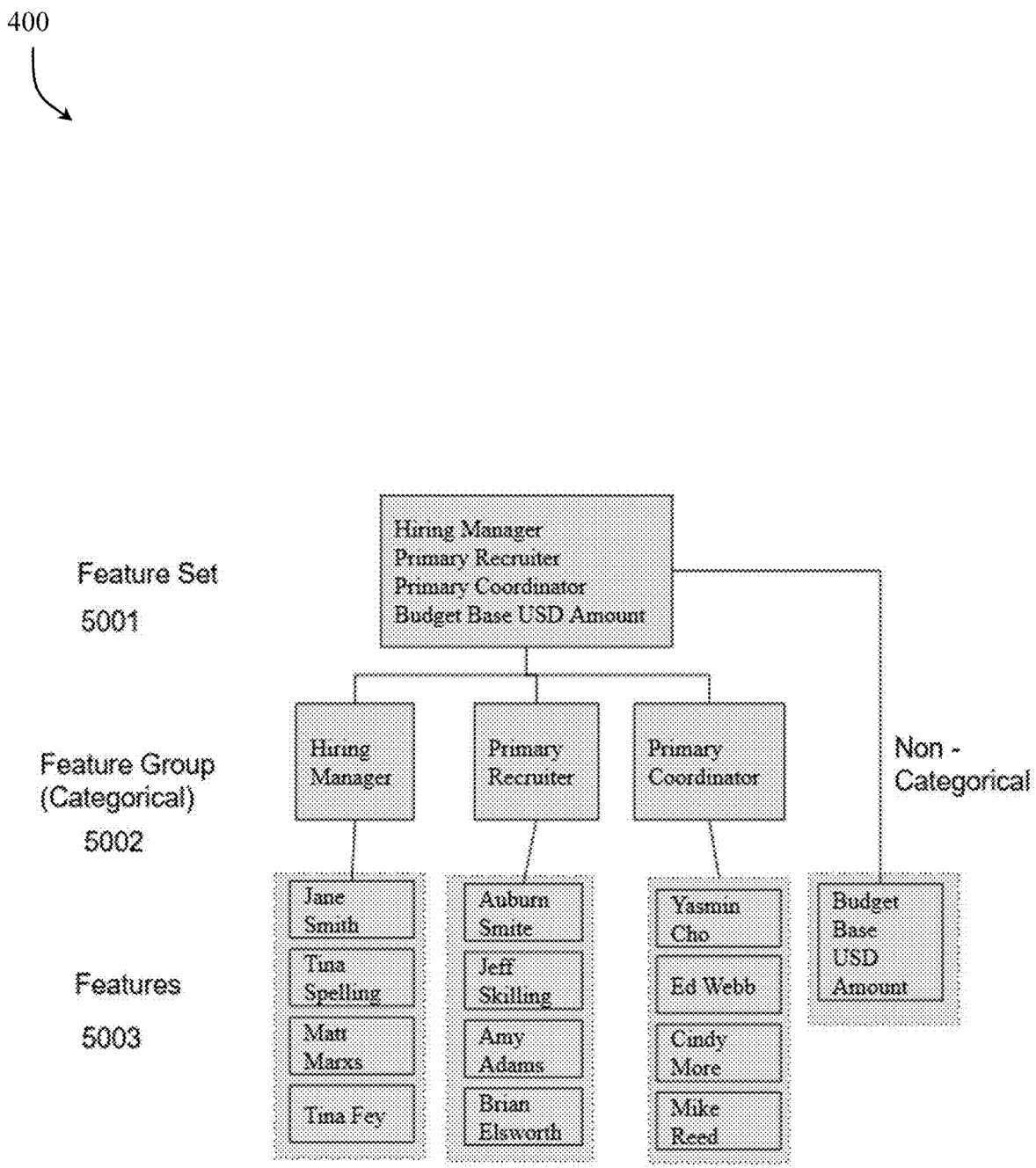
FIG. 3 is an illustrative diagram that describes the hierarchical groupings of categorical variables that are used to both apply to the machine learning algorithms and algorithms used to explain the findings of the machine learning algorithms.
Figure 6:
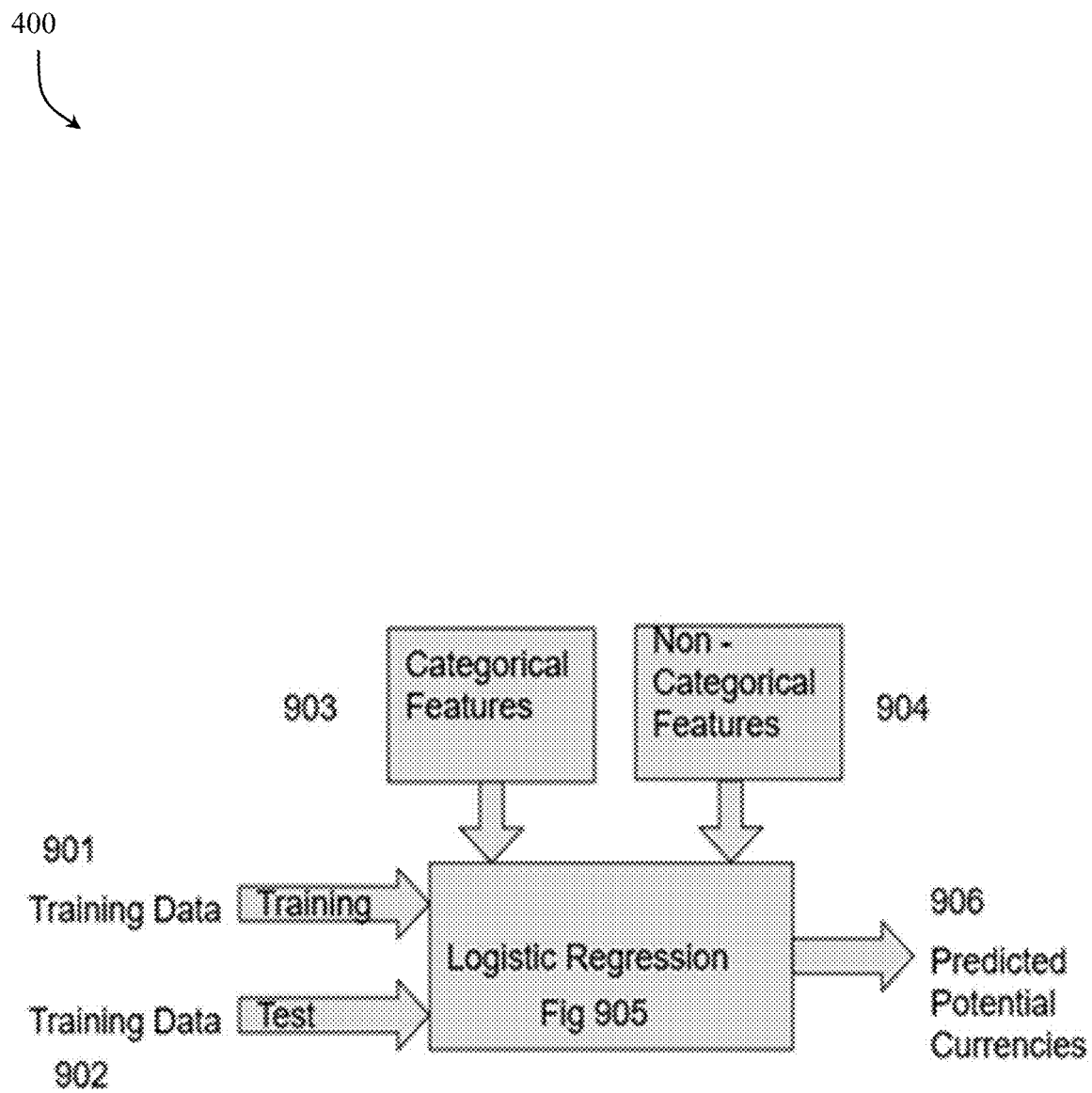
FIG. 6 is an illustrative logistic regression model configured to determine accuracy.

FIG. 3 is an illustrative diagram that describes the hierarchical groupings of categorical variables that are used to both apply to the machine learning algorithms and algorithms used to explain the findings of the machine learning algorithms: Feature Sets, Feature Groups and Features. Feature sets contain non-categorical features and feature groups which consist of categorical features Feature sets 5001 are assembled such that all combinations of feature groups 5002 and non-categorial features 5004 are attempted. As an example, if there are 8 (n) features available and it is preferable to use 6 (r) in the model the method would use the following formula to determine the number of combinations to run into the logistic regression model for accuracy calculations $C(n,r)=n!/(r!(n-r)!)=28$. Thus there would be 28 feature sets 5001 all comprised of different combinations of feature groups 5002 and non-categorical features 5004. In set theory, it is essentially an inner join between multiple datasets, where the system 400 and/or method 100 performs an inner join between data that represents currencies for compensation, currency code and economic zones. The resulting feature sets are then fed into the logistic regression algorithm to determine the feature set with the most accuracy (FIG. 6).

The level 1 metrics calculations 106 process initiates processing. It searches the processed compensation data from the deep character level inspection process. The tagging process counts the number of currency symbols and abbreviations and maps them back to specific currencies. For example, the $ symbol maps to the following currencies: USD, CAD and SGD. The results are stored in storage and are associated with specific columns and jobs.

Figure 4:
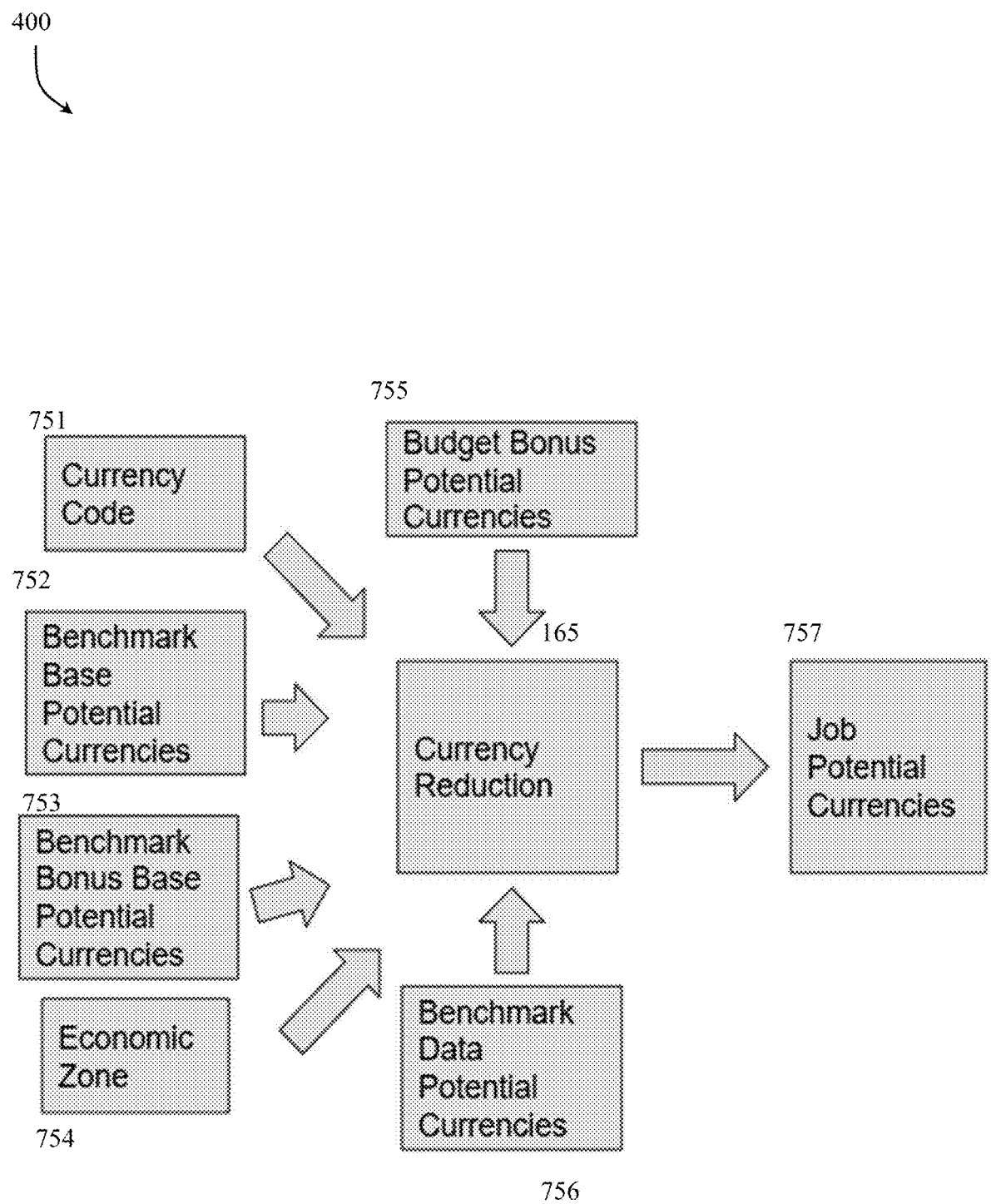
FIG. 4 is an illustrative diagram depicting currency reduction process inputs/outputs.

The currency reduction 165 process steps then begin processing. FIG. 4 is an illustrative diagram depicting currency reduction Inputs and Outputs. The method 100 attempts to determine if the currencies in the level 1 metrics calculations 106 process, the currencies derived the data enrichment process for economic zone and the currencies listed in the currency code data agree with the each other. The result of this is a set containing one or more currency values tied to a job. For example, FIG. 5 is a Currency reduction Venn diagram that illustrates a scenario that shows the logic of how multiple currencies across differing features reduce to a singular currency in the Venn diagram where there are 5 currencies (USD, CAD, AUD, SGD, GBP) that potentially represent the currency for the row. The single currency that is common between the intersection of all three features 2001, 2002, 2003 is the GBP currency. If the features dealing with currency identification can be reduced to a single currency the row is flagged in a way that signals that the row has a high confidence level that the currency data is well formed and serves as the basis for training data in the Segregate Test Datasets and Training Datasets 108 step. If any of the features groups in the compensation category (see, Table 7000) do not have any currencies specified then all potential currencies are specified for that feature groups (see, Table 7000) is set (i.e. USD, EUR, YEN, SGP, CAD, GBP etc.).

The currency conversion process step 165 begins. This process takes the amount data from the numerical data extraction 104 process and standardizes it to USD using conversion market rates for dates that correspond to at or slightly before the jobs open date (see, Table 2000). The native currency for the conversion is represented by every potential currency (see, FIG. 5) identified in the currency reduction process 165. The new converted values are stored in Budget Bonus USD Amount (see, Table 8000), Budget Base USD Amount, Benchmark Base USD Amount and are associated with specific jobs.

The segregate test datasets and training datasets 108 step then begins processing. Training job data rows are marked as such if the following criteria are met:

[feature groups (300): category=compensation]=[Source Data Schema (200): Currency Code]=[feature groups (300): category=geographic]

Figure 7:
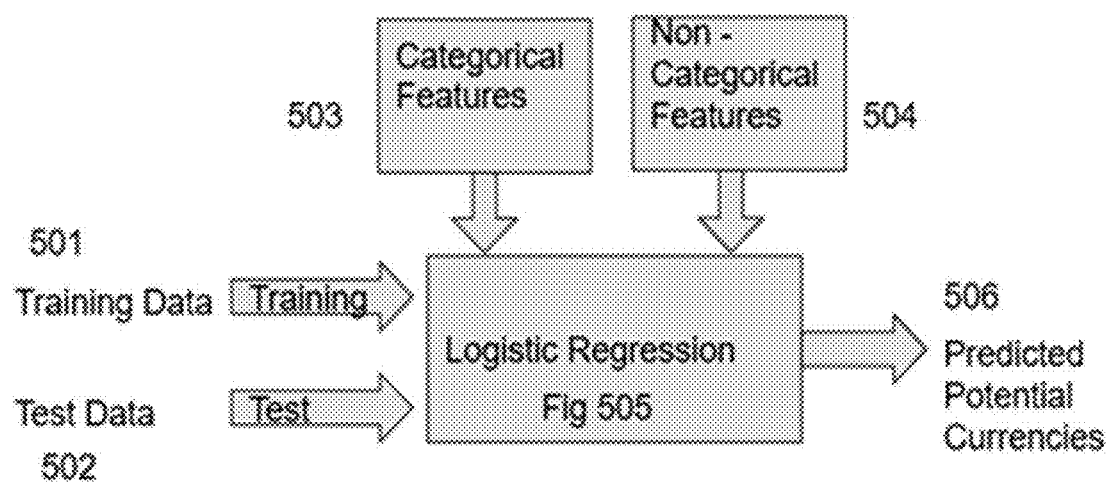
FIG. 7 is an illustrative logistic regression model configured to work with test data.

These can be reduced to a singular currency value. For example, the following dataset would represent a training dataset because all the necessary feature groups match:

[feature groups (300): category=compensation]=USD
[Source Data Schema (200): Currency Code]=USD
[feature groups (300): category=geographic]=USD The singular currency value is set as the correct value for the training dataset which is fed into the logistic regression algorithms FIG. 6 is a logistic regression model configured to determine accuracy. FIG. 7 is a logistic regression model configured to work with test data. Test rows are set as all rows that do not fit into training rows (i.e. jobs that have multiple potential currencies associated with them. or rows with mismatched compensation features (see, Table 7000), Currency Code (see, Table 2000) and the currencies flagged for the Economic Zone feature (see, Table 7000)). The following example would represent training data as the overall potential currencies for the job are not singular (USD and EUR):

[feature groups (300): category=compensation]=USD, EUR [Source Data Schema (200): Currency Code]=USD [feature groups (300): category=geographic]=USD The feature set generation and evaluation 109 process initiates processing. Using recursive feature elimination and cross-validation techniques, the process iterates through and combines features (see, Table 8000) (non-categorical features) and feature groups 5002, 300 (for categorical features), adding features in a series of loops to form a feature set (see, FIG. 3). Constraints are placed on the minimum number (see, Table 5000) and maximum number (see, Table 5000) of features and feature groups to contain in a feature set (Minimum number of feature groups and non-categorical features, Maximum number of feature groups and non-categorical feature). The output of this step is a number of features sets (see, Table 9000). The feature sets (see, Table 9000) are individually applied to the logistic regression algorithm 900 using training data for both the test datasets 901 and training datasets 902. Accuracy is calculated as a ratio of correctly predicted observation to the total observations. For accuracy prediction calculations, training data is used for both training and test and is applied to the logistic regression model 900.

The fit process begins processing 110, 500. Training 501 and test data 502 are applied using the feature set 5001 with the highest level of accuracy (see, Table 9000) to the logistic regression model 503, 504. The logistic regression model calculates the features and creates predictions for which currencies belong to which Job records. Anomalous predicted currencies for the test data are identified as differentials between the dataset's predicted currency and the currency used in the economic zone (see, Table 7000) and/or the currency code (see, Table 7000). For example, if currency information is not present for both economic zone (see, Table 7000) and the currency code (see, Table 7000) the row is tagged as anomalous.

Machine learning algorithms are used in the system and method or process, with a specific example being Logistic Regression. Machine learning is used to specifically tailor rules to detect errors. For Example, Logistic Regression is used in the system and method or process in two different ways. Generally, the goal of a multiple logistic regression is to find an equation that best predicts the probability of a value derived from a function of X variables, where logistic regression mathematically examines the relationship between different features and predicts a category for the record. The general logistic regression algorithm is represented by the logit:

$$g(x) = \beta 1 X1 + \beta 2 X2 + \beta i X i$$

The first way Logistic Regression is used is to determine the accuracy of the features (using only training data). The second is to use the training data to make predictions about how the test data should be categorized. In the example case, if examining the relationship between different categories (see, Table 2000) of data including recruitment personnel, Job Specific and Compensation data. The nominal variable for the training dataset is the reduced singular reduced currency value. Logistic regression used by the invention specific employs features to determine the type of currency compensation used.

In such a methodology K represents the number of potential currencies in the system. The multinomial logistic regression algorithm uses k independent binary logistic models. For example, if a company has jobs that are paid in EUR, USD, CAD and YEN then there would be K=four logistic regression models used to perform the multinomial logistic regression calculations as follows. g(x) is the probability of an outcome, in this case the predicted currency. The training data used for logit uses the nominal variable derived from the singular currency value 2004 (i.e. EUR logit uses EUR training data).

TABLE 3000

| CURRENCY | FORMULA | TRAINING DATASET |
|---|---|---|
| EUR | g(x) = β1X1 + β2X2 + β3X3 | Training data with currency singular value currency reduction (750, 2004) equal to EUR. |
| USD | g(x) = β1X1 + β2X2 + β3X3 | Training data with currency singular value currency reduction (750, 2004) equal to USD. |
| CAD | g(x) = β1X1 + β2X2 + β3X3 | Training data with currency singular value currency reduction (750, 2004) equal to CAD. |
| YEN | g(x) = β1X1 + β2X2 + β3X3 | Training data with currency singular value currency reduction (750, 2004) equal to YEN. |

X1, X2 and X3 are the values for the independent variables in the training dataset. If using, for example, one independent Feature Groups (see, Table 7000) (Hiring Manager with two associated features (Jane Smith and Bob Dole)) and one independent Feature (Budget Base USD Amount) in a multinomial logistic regression model the data may look as follows:

TABLE 4000

Truncated Training Data

| Nominal Variable (Correct Currency derived from singular currency value (705, 2004)) | X1 - Hiring Manager (Jane Smith) | X2 - Hiring Manager (Bob Dole) | X3 - Budget Base USD Amount |
|---|---|---|---|
| EUR | 0 | 1 | 50,000 |
| EUR | 1 | 1 | 57,000 |
| EUR | 0 | 0 | 49,000 |
| EUR | 0 | 0 | 93,000 |
| EUR | 1 | 1 | 45,000 |
| EUR | 0 | 1 | 67,000 |

Maximum likelihood estimator calculations are used to determine β coefficients. For the purposes of this invention there are two methods of performing the maximum likelihood calculation:

For categorical features, a binomial distribution is used to calculate the β coefficients. In the example, the presence (1) or absence (0) of a Hiring Manager (Jane Smith) for a particular record set.

$$P(X=0) = (1-\mu)$$

$$P(X=1) = \mu$$

Objective: To determine the maximum likelihood of $\mu$.

$$L(\mu) = P(X=0) * P(X=1) * P(X=0) * P(X=0) * P(X=1) * P(X=0)$$
$$= (1-\mu) * \mu * (1-\mu) * (1-\mu) * \mu * (1-\mu)$$
$$= ((1-\mu)\exp 3) * \mu \exp 2$$

The log is taken to make taking the derivative easier $$\log L(\mu) = \log((1-\mu \exp 3) * \mu \exp 2) = 3 \log(1-\mu) + 2 \log \mu$$

$$d/d\mu \log L(\mu) = 3(1/(1-\mu)*(-1) + 2(1/\mu) = 0$$

$$-3\mu + 2(1-\mu) = 0$$

$$-5\mu + 2 = 0$$

$$\mu = 2/5$$

Thus the β coefficient for feature Hiring Manager (Jane Smith) is ⅖.

The maximum likelihood calculations for non-categorical features are modeled using normal curve assumptions. The data is normalized before applying to the maximum likelihood calculation (−0.569611067, −0.177419841, −0.625638386, 1.839563611, −0.849747658, 0.38285334). The normalization process uses the following calculation, where xi is the value to be transformed x̄ is the mean of the dataset and s is the standard deviation:

$$z_i = \frac{x_i - \bar{x}}{s}$$

The maximum likelihood for a normal distribution is calculated as:

$$f(T) = \frac{1}{\sigma_T \sqrt{2\pi}} e^{-\frac{1}{2}\left(\frac{T-\bar{T}}{\sigma_T}\right)^2}$$

This is reduced to the following calculation for the mean:

$$\bar{T} = \frac{1}{N}\sum_{i=1}^{N} T_i$$

In the example case the mean would equal (−0.569611067−0.177419841−0.625638386+1.839563611−0.849747658+0.38285334)/6=1.38*10 exp(−16). Thus the β coefficient for Budget Base USD Amount is 1.38*10 exp(−16).

Once the β coefficients are derived from maximum likelihood calculations they are substituted into the logit equation as shown below for EUR.

Probability of EUR=g(x)=1.38*10 exp(−16)*X1+⅖*X2

Additional calculations also can be performed for the other currencies using training data specified for the specified currency (i.e. training a logistic regression model for USD only uses training data for rows flagged for USD).

After the logistic regression models for all of the currencies have been calculated test data is applied to the models. The currency model with the highest probability is used for the predicted currency of the row.

The currency data transformation initiates processing. This process takes the amount data from the numerical data extraction 104 process and standardizes it to USD using conversion market rates for dates that correspond to at or slightly before the jobs open date (see, Table 2000). The native currency for the conversion is represented by the logistic regression algorithm's predicted currency for test data. The new converted values are stored in Predicted Budget Bonus USD Amount (see, Table 8000), Predicted Budget Base USD Amount, Predicted Benchmark Base USD Amount, Predicted Benchmark Bonus USD Amount and are associated with specific jobs.

The level 2 metric calculations steps 113 begin processing. Level 2 metric calculations and processing examine all the test data including the anomalous predicted data produced in the fit model process 110, 500 as well as the data that was not flagged as anomalous. Calculations are performed to attempt to explain the reasons why the algorithm (FIG. 7) labeled a job as using a particular currency. Level-2 calculations (see, Table 6000) are performed on the features sets that were selected to be used with the logistic regression algorithm (FIG. 7), no other feature sets are used. Counts and averages are tabulated for features (see, Table 8000) and feature groups (see, Table 7000): Recruitment Personnel, Geography, and Job Specific to determine the counts and averages of jobs associated with currency codes. This may be done by performing calculations (see, Table 6000) all rows of the feature and comparing it to the anomalous one. For example, if an individual primary recruiter is associated with a job where the predicted currency is YEN:

Primary recruiter:
Primary Recruiter: Bob Smith
Number jobs associated with USD (from training data)—0
Number jobs associated with YEN (from training data)—35
Number jobs associated with EUR (from training data)—0
Number jobs associated with GBP (from training data)—0
Job:
Compensation feature (300) currency=USD,
Economic Zone feature (300) currency=EUR,
Currency Code (200) currency=USD
Primary Recruiter='Bob Smith'
Predicted Currency (506)=YEN
Information output to end user (In steps for Presentation and Remediation (114))) may include:
Bob Smith's number of USD jobs (from training data)—0
Average number of USD jobs from primary recruiters (from training data)—35

In this case it would be noted in the explanation to the end user that Yen may have been selected as the predicted currency for the job because the primary recruiter for the job had never worked on a job in YEN currency and the average recruiter that works on USD jobs has 35 posts. The YEN recommendation was made even though the other Job components where in USD and EUR.

The level 2 rules-based data tagging process 113 continues processing. The process examines the amounts that were converted during the currency transformation 111 process which only uses test data. Using specified thresholds (see, Table 5000) the process tags jobs that have compensation amounts that are outside of the normal range of values based upon different averages and standard deviations as well as groupings of features. For example, in the following scenario:

A job for a software developer being paid in rupees has a base compensation of $300,000. This amount is $250,000 more than the average base salary for software developer jobs being paid in rupees. This job would be tagged as being potentially anomalous.

Job:
Predicted Budget Base USD Amount (7000)=$300,000
Predicted Currency (506)=YEN Such information may be output to end user in Presentation and Remediation 114 steps.

Avg. base salary for jobs paid in INR: $50,000
Job's base salary (from training data)–$300,000
Using Level-2 Metric (see, Table 6000) "The percentile of the Base USD Amount" and associated threshold (see, Table 5000) "Maximum percentile of the Base USD Amount" would be triggered (assuming it is set to trigger anything at or over 90%).

The results for individual Job records are determined by combining thresholds (see, Table 5000) with metric calculations (see, Table 6000). Critical ranges of measurement are listed in the Thresholds (see, Table 5000). The thresholds are manually configured and can be adjusted to work uniquely each time the invention is executed. This invention works both on-premises and in the cloud.

TABLE 5000

Thresholds -adjusted settings that serve as limits for various metrics.

| Threshold | Description |
| --- | --- |
| Recruitment graph job count | The minimum count of jobs that a recruitment graph must be present for the row to not be flagged as a contributing factor for a potential error. The grain of this spans each element of the feature. |

TABLE 5000-continued

Thresholds -adjusted settings that serve as limits for various metrics.

| Threshold | Description |
| --- | --- |
| Maximum feature null value percentage for a feature. | The maximum number of null values in a feature before it is excluded from the model. |
| Minimum accuracy percentage for a feature set. | The minimum percentage for a feature set to be included in processing for model fitting (500). |
| Maximum number of feature groups and non-categorical features. | The maximum number of feature groups in a feature set. |
| Minimum number of feature groups and non-categorical features. | The minimum number of feature groups that can be applied to the logistic regression algorithms (500, 900) |
| Maximum percentile of the Base USD Amount | The maximum percentile that a BASE USD amount can equal before throwing an alert. |
| Minimum percentile of the Budget Base USD Amount | The minimum percentile that a BASE USD amount can equal before throwing an alert. |
| Maximum percentile of the Budget Bonus USD Amount | The maximum percentile that a Budget Bonus USD Amount can equal before throwing an alert. |
| Minimum percentile of the Budget Base USD Amount | The maximum percentile that a Budget Base USD Amount can equal before throwing an alert. |

TABLE 6000

Metric Calculations - A table detailing information about metrics that are used to throughout the system. Level 1 metrics use data in the source system schema to perform count calculations. Level 2 metrics use information in the features to perform calculations. The grain use used to describe groupings of data. The example column illustrates an example of the type of metric.

| Metric Calculation Name | Level | Description | Grain | Example |
| --- | --- | --- | --- | --- |
| Detect currency symbols in compensation columns | 1 | Searches each compensation column and row in the source schema (200). Counts the number and associated type of currency symbols. | [Source Schema Job Row: Compensation data columns] | For Job ID 252 there was 1 $ symbol detected in the Budge Base column. |
| Detect currency abbreviation in compensation columns | 1 | Searches each compensation column and row in the source schema (200). Counts the number and associated type of currency abbreviations. | [Source Schema Job Row: Compensation data columns] | For Job ID 252 there was 1 EUR currency abbreviation detected in the Budge Base column. |
| Job count as related to Geography, Job Specific and Recruitment Personnel feature groups. | 2 | Calculates the number of jobs worked on within timespan at a specified grain. | [Time slice] X [Feature Group: Recruitment Personnel] X [Feature Group: Geography] X [Feature Group: Job Specific] | The total number of jobs involving Senior Recruiter 'Mary Smith' using the EUR currency is 2 for all time. |
| Average job counts as related to Geography. Job Specific and Recruitment Personnel feature groups. | 2 | Calculates the average number of jobs worked on within timespan at a specified grain. | [Time slice] X [Feature Group: Recruitment Personnel] X [Feature Group: Geography] X [Feature Group: Job Specific] | The average number of jobs involving a Senior Recruiter using the EUR currency is 45 for all time. |
| The percentile of the Base USD Amount | 2 | The percentile of Base USD Amount from normal | [Feature Group: Geography] X [Feature Group: Job Specific] | The job with id 432 has a Base USD Amount in the $100^{th}$ percentile for jobs using EUR in the IT Department. |
| The percentile of the Budget Bonus USD Amount | 2 | The percentile of Base USD Amount from normal | [Feature: Geography] X [Feature: Job Specific] | The job with id 438 has a Budget Bonus USD Amount in the $56^{th}$ percentile for jobs using EUR in the IT Department. |

Anomalies are detected three different ways.

During the currency reduction 165 process rows are examined to find anomalous data which is then grouped into test data, as demonstrated in the Venn diagram of FIG. 5.

TABLE 7000

Categorical Features Groups - these represent various components of the Job that can be used to plug into different analytic processes.

| Feature Groups | Category | Analytic Process | Feature Example |
|---|---|---|---|
| Budget Bonus Potential Currencies | Compensation | Currency Reduction, Level 2 Metrics Calculations | EUR, USD |
| Benchmark Base Potential Currencies | Compensation | Currency Reduction, Level 2 Metrics Calculations | EUR, USD |
| Benchmark Bonus Base Potential Currencies | Compensation | Currency Reduction, Level 2 Metrics Calculations | EUR, USD |
| Benchmark Data Potential Currencies | Compensation | Currency Reduction | EUR, USD |
| Job Potential Currency | Compensation, Geographic, Job Specific | Segregate Test and Training Datasets | EUR, USD |
| Economic Zone | Geographic | Currency Reduction | EUR, USD |
| Hiring Manager | Recruitment Personnel | Feature Set Generation and Evaluation, Level 2 Metrics Calculations | Bob Smith |
| Primary Recruiter | Recruitment Personnel | Feature Set Generation and Evaluation, Level 2 Metrics Calculations | Jane Tarkington |
| Secondary Recruiters | Recruitment Personnel | Feature Set Generation and Evaluation, Level 2 Metrics Calculations | Ellen Weir |
| Primary Coordinator | Recruitment Personnel | Feature Set Generation and Evaluation, Level 2 Metrics Calculations | Joong Cho |
| Secondary Coordinators | Recruitment Personnel | Feature Set Generation and Evaluation, Level 2 Metrics Calculations | Wei Seng |
| Sourcers | Recruitment Personnel | Feature Set Generation and Evaluation, Level 2 Metrics Calculations | Amy Zue |
| Default offer approvers | Recruitment Personnel | Feature Set Generation and Evaluation, Level 2 Metrics Calculations | Tom Thorn |
| Job Approvers: Start Recruiting | Recruitment Personnel | Feature Set Generation and Evaluation. Level 2 Metrics Calculations | Harry Ellison |
| Job Approvers: Official Job Approval | Recruitment Personnel | Feature Set Generation and Evaluation. Level 2 Metrics Calculations | Tim Corkrin |
| VP | Recruitment Personnel | Feature Set Generation and Evaluation. Level 2 Metrics Calculations | Adam Jansen |
| Currency Code | Job Specific | Currency Reduction | EUR |
| Employment Type | Job Specific | Feature Set Generation and Evaluation. Level 2 Metrics Calculations | Full-Time |
| Req | Job Specific | Feature Set Generation and Evaluation, Level 2 Metrics Calculations | Backfill |
| Level | Job Specific | Feature Set Generation and Evaluation, Level 2 Metrics Calculations | Professional |
| Organization | Job Specific | Feature Set Generation and Evaluation, Level 2 Metrics Calculations | Sales |
| Job | Job Specific | Feature Set Generation and Evaluation, Level 2 Metrics Calculations | Drupal Developer |
| Department | Job Specific | Feature Set Generation and Evaluation, Level 2 Metrics Calculations | IT |

TABLE 8000

Non-Categorical Features - The non-categorical features that can be used in the logistic regression models.

| Feature | Description | Analytic Process |
|---|---|---|
| Budget Bonus USD Amount | The amount derived from the Budget Bonus source column (200). The numerical data extraction process (104) extracts the numerical value. The currency data transformation process converts the currency to USD from the native currency. | |
| Budget Base USD Amount | The amount derived from the Budget Base source column (200). The numerical data extraction process (104) extracts the numerical value. The currency data transformation process converts the currency to USD from the native currency. | |
| Benchmark Base USD Amount | The amount derived from the Benchmark Base source column (200). The numerical data extraction process (104) extracts the numerical value. The currency data transformation process converts the currency to USD from the native currency. | |
| Benchmark Bonus USD Amount | The amount derived from the Benchmark Bonus source column (200). The numerical data extraction process (104) extracts the numerical value. The currency data transformation process converts the currency to USD from the native currency. | |
| Predicted Budget Bonus USD Amount | The predicted amount based upon the logistic regression algorithm's predicted native currency converted to USD and the amount extracted (104) from the Budget Bonus column (200) | |
| Predicted Budget Base USD Amount | The predicted amount based upon the logistic regression algorithm's predicted native currency converted to USD and the amount extracted (104) from the Budget Base column (200) | |
| Predicted Benchmark Base USD Amount | The predicted amount based upon the logistic regression algorithm's predicted native currency converted to USD and the amount extracted (104) from the Benchmark Base column (200) | |
| Predicted Benchmark Bonus USD Amount | The predicted amount based upon the logistic regression algorithm's predicted native currency converted to USD and the amount extracted (104) from the Benchmark Bonus column (200) | |

Below is an example to illustrate the following: "Anomalous predicted currencies for the test data are identified as differentials between the dataset's predicted currency and the currency used in the economic zone (see, Table 7000) and/or the currency code (see, Table 7000). If currency information is not present for both economic zone (see, Table 7000) and the currency code (see, Table 7000) the row is tagged as anomalous" Thresholds are not used.

The following row would be recognized as anomalous because the predicted currency derived from the logistic regression algorithm is different than those of both the Economic Zone and Currency Code:
  Economic Zone: USD
  Currency Code: USD, EUR
  Predicted Currency: INR The following row would be recognized as not being analogous because the predicted currency derived from the logistic regression algorithm is in both that of the Economic Zone and the Currency Code:
  Economic Zone: USD
  Currency Code: USD, EUR
  Predicted Currency: USD Thresholds do come into play when examining the deviation of a predicted amount (see, Table 8000) from the predicted amount of other jobs. The grain of this comparison is at ([Feature Group: Geography] X [Feature Group: Job Specific]). The converted predicted amounts (see, Table 8000) for Base USD, Budget Base USD, Budget Bonus USD and Budget Base USD ranked into percentiles. If a predicted amount is in say the 175th percentile for programmers working in an economic zone that uses INR, the record would be identified as anomalous. The following thresholds are used for this comparison:
  Maximum percentile of the Base USD Amount
  Minimum percentile of the Budget Base USD Amount
  Maximum percentile of the Budget Bonus USD Amount
  Minimum percentile of the Budget Base USD Amount Level 2 calculations are used as a smoke test to determine if the predictions made by the logistic regression algorithm are rational. For example, a dataset may contain the following suspect data:
  Job: Programmer
  Economic Zone: USD
  Currency Code: USD, INR
  Predicted Currency: INR
  Base USD Amount: $3,454,227

In this case it is irrational to pay a programmer $3,456,227 when the average salary of programmers who are paid in dollars is $95,000. Thus the prediction would be flagged as an anomaly.

Examples of various Level 2 calculations are represented in Table 6000, where example pseudo code may include the following:
  Select avg(base salary), [Economic Zone], Job
  From training_data
  Where [Economic Zone]='USD' and
  JobID not in [the job being analyzed] and
  Job='Programmer'
  Group by
  [Economic Zone], Job

TABLE 9000

Feature Sets Example - Feature sets are a collection of feature groups which are comprised of categorical features. This table illustrates how feature sets can have a calculated accuracy associated with them.

| Feature Set ID | Feature Sets | Accuracy |
|---|---|---|
| 1 | 1) Hiring Manager<br>2) Secondary Coordinator<br>3) Department | 78% |
| 2 | 1) Primary Recruiter<br>2) Level<br>3) Job Title | 45% |

TABLE 9000-continued

Feature Sets Example - Feature sets are a collection of feature groups which are comprised of categorical features. This table illustrates how feature sets can have a calculated accuracy associated with them.

| Feature Set ID | Feature Sets | Accuracy |
|---|---|---|
| 3 | 1) Hiring Manager<br>2) Secondary Coordinator<br>3) Department<br>4) Job Approvers: Official Job Approval | 53% |
| 4 | 1) Level<br>2) Employment Type<br>3) Department | 95% |

Figure 8:
FIG. 8 depicts an example user interface (UI) that illustrates the results presented to the user through a web page, app or other electronic form for confirming anomalous data is correct or incorrect from the listing of the anomalies for a job to a user.

The Presentation and Remediation 114 steps of the method 100 then initiate. FIG. 8 depicts an example UI that illustrates how to manually tag a Job for correctness and listing the anomalies for a job to a user. The results of the processing are presented to the user through a web page, app or other electronic form (FIG. 8) manually confirming anomalous data is correct or incorrect (FIG. 8). Or By mapping the office data to predefined economic zones (FIG. 5). There exists a prepopulated table with specific narratives to report on anomalies. Specific narratives are triggered when thresholds are breached with the appropriate metric filled in. An example narrative would be "This job has a Predicted Base Salary that is % above the average for jobs paid in % for jobs of type %". The first percentage would have a metric substituted in that represents how much the job is above the average for programmers paid in INR. The other two %s would be "programmer" and "INR".

The results of the processing are presented to the user through a web page, app or other electronic form (FIG. 8). The end user can manually decide which jobs originating from test data 108 have predicted currencies that should be manually marked as errant or correct 7001. There is a specific call out to the end user to validate jobs in cases where multiple potential currencies derived from the Currency Reduction 165 process are eligible for a job 7003, 7004. Jobs that had been marked as test data during the segregate test and training datasets 108 process but marked as correct 7001 during the remediation process are put into training data instead of test data in the segregate test and training datasets 108 process the next time the data is processed 7005. The data can then be processed 101 with potentially new anomalies being detected and old anomalies being tagged as not being anomalies. Dynamic features are presented in the User Interface, presents the narratives, about the display. The invention can post or present a Venn diagram similar to what is located in FIG. 5, for every row where there is an anomaly, there exists a table that has narratives in it without specific numbers. Numbers are plugged into the narratives when thresholds are breached. If it is detected that a Base USD Amount is in the 175% percentile for base salaries then the narrative is triggered and displayed to the end user with numbers plugged into it. An example of a narrative is "This job has a Predicted Base Salary that is % above the average for jobs paid in % for jobs of type %". With the numbers plugged into it, it would be "This job has a Predicted Base Salary that is 175% above the average for jobs paid in INR for jobs of type Programmer".

As would be appreciated by one skilled in the art, the various depictions and combinations of currency reductions and corrections discussed with respect to FIGS. 1-9 are not meant to be limiting and are merely examples of the variations that are enabled by the system and method of the present invention. As would be appreciated by one skilled in the art, various different algorithms known in the art may be used to detect errors. Other embodiments may substitute a different ML classification technique and derive a similar result. Alternative embodiments to the example logistic regression embodiment include use of neural networks, linear regression, tree-based algorithms, decision trees, random forests, and/or gradient boosting embodiments. Also, in alternative embodiments, the underlying source schema 200 that is used as the basis to perform calculations may instead use or adopt a different schema configuration.

Figure 9:
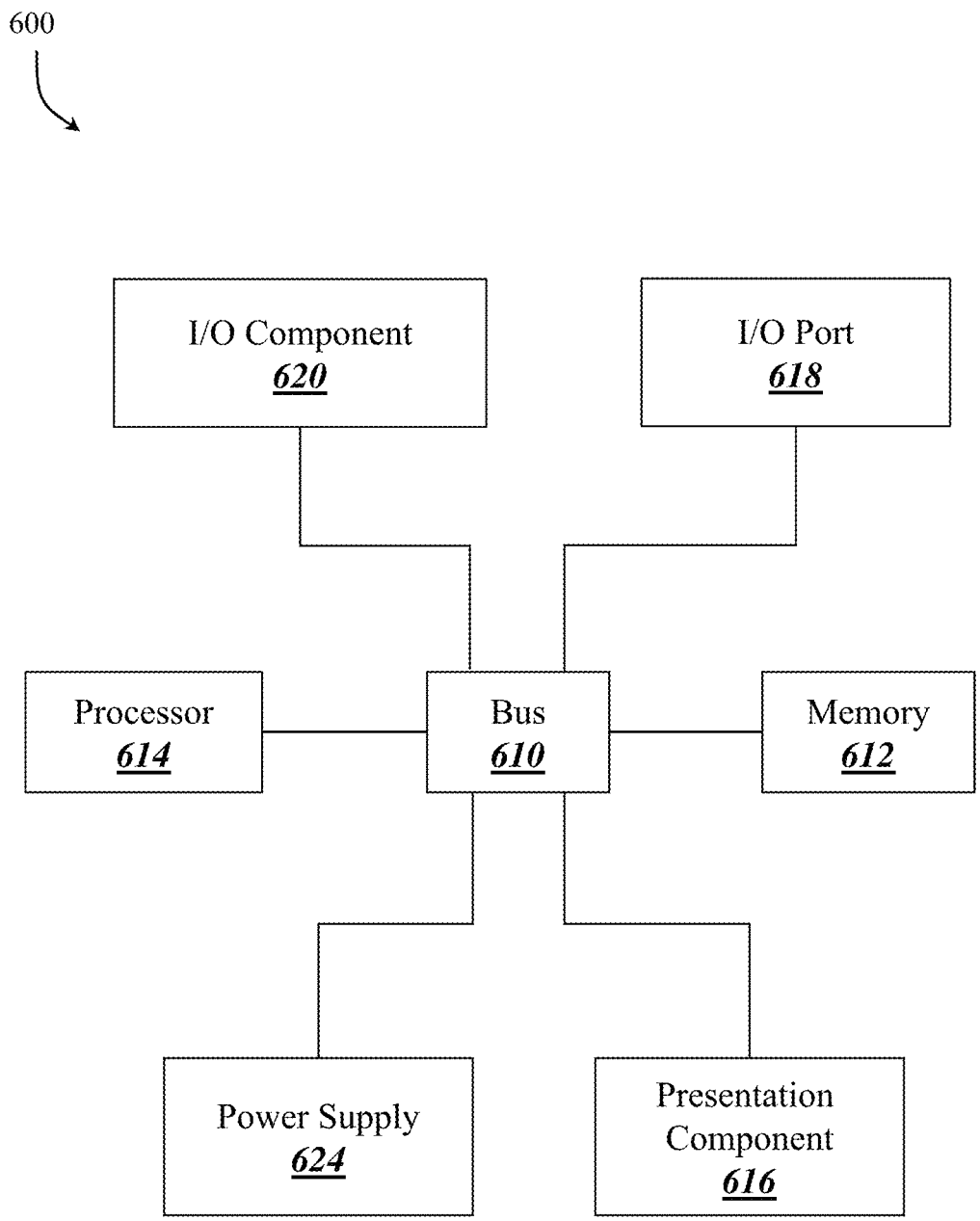
FIG. 9 is a diagrammatic illustration of a high level architecture for implementing processes in accordance with aspects of the invention.

Any suitable computing device can be used to implement the computing device 112 and methods/functionality described herein. One illustrative example of such a computing device 600 is depicted in FIG. 9. The computing device 600 is merely an illustrative example of a suitable computing environment and in no way limits the scope of the present invention. A "computing device," as represented by FIG. 9, can include a "workstation," a "server," a "laptop," a "desktop," a "hand-held device," a "mobile device," a "tablet computer," or other computing devices, as would be understood by those of skill in the art. Given that the computing device 600 is depicted for illustrative purposes, embodiments of the present invention can utilize any number of computing devices 600 in any number of different ways to implement a single embodiment of the present invention. Accordingly, embodiments of the present invention are not limited to a single computing device 600, as would be appreciated by one with skill in the art, nor are they limited to a single type of implementation or configuration of the example computing device 600.

The computing device 600 can include a bus 610 that can be coupled to one or more of the following illustrative components, directly or indirectly: a memory 612, one or more processors 614, one or more presentation components 616, input/output ports 618, input/output components 620, and a power supply 624. One of skill in the art will appreciate that the bus 610 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 9 is merely illustrative of an example computing device that can be used to implement one or more embodiments of the present invention, and in no way limits the invention.

The computing device 600 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 600.

The memory 612 can include computer-storage media in the form of volatile and/or nonvolatile memory. The memory 612 can be removable, non-removable, or any combination thereof. Example hardware devices are devices such as hard drives, solid-state memory, optical-disc drives, and the like. The computing device 600 can include one or more processors that read data from components such as the memory 612, the various I/O components 616, etc. Presentation component(s) 616 present data indications to a user or other device. Example presentation components include a display device, speaker, printing component, vibrating component, etc.

The I/O ports 618 can enable the computing device 600 to be logically coupled to other devices, such as I/O components 620. Some of the I/O components 620 can be built into the computing device 600. Examples of such I/O components 620 include a microphone, joystick, recording device, game pad, satellite dish, scanner, printer, wireless device, networking device, and the like.

To any extent utilized herein, the terms "comprises" and "comprising" are intended to be construed as being inclusive, not exclusive. As utilized herein, the terms "example", "example", and "illustrative", are intended to mean "serving as an example, instance, or illustration" and should not be construed as indicating, or not indicating, a preferred or advantageous configuration relative to other configurations. As utilized herein, the terms "about" and "approximately" are intended to cover variations that may existing in the upper and lower limits of the ranges of subjective or objective values, such as variations in properties, parameters, sizes, and dimensions. In one non-limiting example, the terms "about" and "approximately" mean at, or plus 10 percent or less, or minus 10 percent or less. In one non-limiting example, the terms "about" and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A computer implemented method for automatically detecting and rectifying data anomalies to synchronize human resource datasets, the method comprising:

receiving, using a computing device, raw human resource data from an external source, the raw human resource data including compensation data and storing the received raw human resource data in data storage according to a source data schema;

configuring, using a computing device, the raw human resource data stored in data storage according to a source data schema including currency reduction on the compensation data and storing the configured data in data storage;

processing, using a computing device, the configured data to determine anomalies in the compensation data using a machine learning predictive model and storing the results in data storage, wherein processing the configured data comprises:

segregating and preparing test datasets and training datasets;

generating and evaluating feature sets comprising extracting relevant content from the transformed data;

fitting, validating, and testing predictive model comprising the steps of:

training a logistic regression model applying machine learning algorithms to the at least one predictive model and calculating model accuracy wherein feature sets are tested in the at least one predictive model for accuracy with respect to results corresponding to the training datasets to create a hierarchy of one or more candidate models wherein the one or more candidate models that produce a highest level of accuracy using training data of the training datasets are selected for use in the at least one predictive model, wherein accuracy is calculated as a ratio of correctly predicted observation to total observations and wherein a currency model with a highest probability is used for a predicted currency of a row singular currency value is set as a correct value for the training dataset which is fed into logistic regression algorithms to output a number of features sets that are individually applied to the logistic regression algorithms using training data for both the test datasets and training datasets; and after logistic regression models comprising the at least one predictive model for all relevant currencies have been calculated, the at least one predictive model is fit with test data of the test dataset and the at least one predictive model is run to identify potential errant rows or records in the raw data and test data of the test dataset, wherein training data and test data are applied using a feature set with the highest level of accuracy to the logistic regression model that calculates the features and creates predictions for which currencies belong to which job records, where anomalous predicted currencies for the test data are identified as differentials between predicted currency of the test dataset and currency used in an economic zone and/or currency code, wherein if currency information is not present for both the economic zone and the currency code, a row is tagged as anomalous;

deploying the predictive model and transforming currency data; and calculating second level metrics using model data; and generating and displaying, through a graphical user interface of a computing device, the results of the predictive model indicating anomalies in the compensation data stored in the data storage together with potential reasons for anomalies and suggested correction to rectify and synchronize the data.

2. The method of claim 1, wherein the step of configuring the raw human resource data comprises:

performing data enrichment on the raw data;

performing deep character level inspection on enriched data;

extracting numerical data from the enriched data;

analyzing the numerical data and performing currency reduction;

calculating first level metrics; and transforming currency data and updating data records with transformed data.

3. The method of claim 1, wherein the performing currency reduction comprises transforming currency data into a standardized format.

4. The method of claim 1, wherein storing the received raw human resource data in data storage according to a source data schema comprising creating an extract from the raw data comprising rows and columns, stored in data storage comprising at least one database or network of distributed files residing on a plurality of network-based non-transitory storage devices, and creating input variables from relevant content in the raw data, the input variables to be populated into the predictive model storing information in a standardized format.

5. The method of claim 2, wherein data enrichment of the raw data maps data fields or records comprising a location or an office to a predefined and populated economic zone that is associated with currencies, then stored in data storage.

6. The method of claim 2, wherein calculating first level metrics comprises performing simple search and count tasks against a source schema, wherein calculation results are stored in data storage.

7. The method of claim 2, wherein deep character level inspection inspects each character in a row or column of the enriched data, categorizing each character as a symbol, letter or space, and wherein multiple characters are joined together, and patterns are identified, and results of deep character level inspection are stored in data storage.

8. The method of claim 7, wherein extracting numerical data analyzes the results of deep character level inspection to identify currency symbols and abbreviations in compensation columns, and numerical components that fit patterns representing numbers are identified as currency amounts and stored in data storage.

9. The method of claim 7, wherein the currency amounts are converted to a query currency using conversion rates for days closest to a job posting date or open date.

10. The method of claim 7, wherein the currency amounts are converted to query currency comprising United States Dollars (USD) using conversion rates for days closest to a job posting date or open date.

11. The method of claim 1, wherein segregating and preparing test datasets and training datasets further comprises training the predictive model using a training dataset selected from the raw data and a test dataset selected from the raw data, wherein training rows comprising the training datasets are marked if currencies in compensation columns and currencies flagged for economic zone column match and then are reduced to a singular value, and wherein test rows comprising the test datasets are marked as all rows that do not fit into training rows.

12. The method of claim 1, wherein a feature set comprises a grouping of features, and generating and evaluating feature sets comprises using recursive feature elimination and cross-validation techniques and iterating through and combining features, including non-categorical features and feature groups for categorical features, adding and/or subtracting features in dynamic combinations in a series of loops to form at least one feature set, wherein constraints are placed on a minimum and a maximum number of features and feature groups to contain in a feature set, and outputting a number of feature sets with individual features being ranked with respect to one another within each feature set.

13. The method of claim 1, wherein the at least one predictive model further comprises a multiple logistic regression model used to find an equation that best predicts the probability of a value derived from a function of variables indicating predictions for which currencies belong to which job records in the raw data, training dataset and testing dataset.

14. The method of claim 2, wherein calculating second level metrics using model data comprises calculations performed against features of the feature sets to explain reasons why anomalous records or jobs were labeled as particular currencies, wherein once calculations are performed on the features sets that were selected to be used with a logistic regression algorithm, wherein second level calculations are used to determine if the predictions made by a logistic regression algorithm yield useable, consistent results, and wherein second level metrics comprise one or more of: detect currency symbols in compensation columns; detect currency abbreviation in compensation columns; job count as related to geography, job specific and recruitment personnel feature groups; average job counts as related to geography, percentile of base USD amount; percentile of the budget bonus USD amount; and combinations thereof.

15. The method of claim 1, wherein automatically generating and displaying, to the user, through the graphical user interface of the computing device, results of the predictive model further comprises at least one list indicating instances of erroneous data in the raw data presented to the user using a web page, app or other electronic format jobs are linked to predicted currencies with a corresponding listing of potential reasons why the raw data is erroneous and suggested corrections to rectify the raw data and synchronize the raw data including a notification that justifies the suggested corrections using evidence derived from the raw data and test dataset as well as providing, through a graphical user interface, tools for the user to analyze and review potentially erroneous data and accept suggested corrections or other actions synchronizing data, such that the user can manually decide which anomalous jobs are errors, not-errors or unknown, wherein resultant data can then be reprocessed using the method, with potentially new anomalies being detected and old anomalies being tagged as not being anomalies.

16. The method of claim 15, wherein displaying, to the user, through the graphical user interface of the computing device, results of the predictive model further comprises outputting at least one of a numerical score, a graphical format, a Venn diagram, a visual aid and a notification.

17. The method of claim 16, wherein displaying a notification to the user comprises accessing a table in the data storage that has narratives stored and selecting or extracting numbers or values from second level calculations that are inserted into the narratives when thresholds are breached or exceeded, where each narrative of the narratives that is triggered when thresholds are breached or exceeded is inserted and combined into the notification displayed to the user on the graphical user interface with numbers or values inserted into it, for review by the user.

18. A system for automatically detecting and rectifying data anomalies to synchronize datasets, the system comprising:
one or more databases or distributed file systems communicating over an electronic network and configured for data storage; and
a computing device comprising one or more processors, memory, programmable instructions or applications, machine learning algorithm modules calculation engines, and at least one operating system (OS), and configured to:
receive, raw human resource data from an external source, the raw human resource data including compensation data and store the received raw human resource data in data storage according to a source data schema;
configure the raw human resource data stored in data storage according to a source data schema including currency reduction on the compensation data and store the configured data in data storage;
process the configured data to determine anomalies in in the compensation data using a machine learning predictive model and storing the results in data storage, wherein to process the configured data the computing device:
segregates and prepares test datasets and training datasets;
generates and evaluates feature sets comprising extracting relevant content from the transformed data;
fits, validates, and tests predictive model comprising:
training a logistic regression model applying machine learning algorithms to the at least one predictive model and calculating model accuracy wherein feature sets are tested in the at least one predictive model for accuracy with respect to results corresponding to the training datasets to create a hierarchy of one or more candidate models wherein the one or more candidate models that produce a highest level of accuracy using training data of the training datasets are selected for use in the at least one predictive model,
wherein accuracy is calculated as a ratio of correctly predicted observation to total observations and wherein a currency model with a highest probability is used for a predicted currency of a row singular currency value is set as a correct value for the training dataset which is fed into logistic regression algorithms to output a number of features sets that are individually applied to the logistic regression algorithms using training data for both the test datasets and training datasets; and
after logistic regression models comprising the at least one predictive model for all relevant currencies have been calculated, the at least one predictive model is fit with test data of the test dataset and the at least one predictive model is run to identify potential errant rows or records in the raw data and test data of the test dataset, wherein training data and test data are applied using the feature set with the highest level of accuracy to the logistic regression model that calculates the features and creates predictions for which currencies belong to which job records, where anomalous predicted currencies for the test data are identified as differentials between predicted currency of the test dataset and currency used in an economic zone and/or currency code, wherein if currency information is not present for both the economic zone and the currency code, a row is tagged as anomalous;
deploys the predictive model and transforms currency data; and
calculates second level metrics using model data; and
a graphical user interface configured to generate and display the results of the predictive model indicating anomalies in the compensation data stored in the data storage together with potential reasons for anomalies and suggested correction to rectify and synchronize the data.

19. The system of claim 18, wherein to configure the raw human resource data the computing device:
performs data enrichment on the raw data;
performs deep character level inspection on enriched data;
extracts numerical data from the enriched data;
analyzes the numerical data and performing currency reduction;
calculates first level metrics; and
transforms currency data and updates data records with transformed data.

20. The system of claim 18, further configured to create an extract from the raw data comprising rows and columns, stored in data storage comprising at least one database or network of distributed files residing on a plurality of network-based non-transitory storage devices, and creating input variables from relevant content in the raw data, the input variables to be populated into the predictive model storing information in a standardized format.

21. The system of claim 19, wherein data enrichment of the raw data maps data fields or records comprising a location or an office to a predefined and populated economic zone that is associated with currencies, then stored in data storage.

22. The system of claim 19, wherein first level metrics are calculated by performing simple search and count tasks against a source schema, wherein calculation results are stored in data storage.

23. The system of claim 19, wherein deep character level inspection is performed each character in a row or column of the enriched data, categorizing each character as a symbol, letter or space, and wherein multiple characters are joined together, and patterns are identified, and results of deep character level inspection are stored in data storage.

24. The system of claim 19, wherein the system is further configured to extract numerical data from results of deep character level inspection to identify currency symbols and abbreviations in compensation columns, and numerical components that fit patterns representing numbers are identified as currency amounts and stored in data storage, and wherein the currency amounts are converted to a query currency using conversion rates for days closest to a job posting date or open date.

25. The system of claim 18, wherein the system is further configured to use test datasets and training datasets to train the predictive model using a training dataset selected from the raw data and a test dataset selected from the raw data, wherein training rows comprising the training datasets are marked if currencies in compensation columns and currencies flagged for economic zone column match and then are reduced to a singular value, and wherein test rows comprising the test datasets are marked as all rows that do not fit into training rows.

26. The system of claim 18, wherein a feature set comprises a grouping of features, and generating and evaluating feature sets comprises using recursive feature elimination and cross-validation techniques and iterating through and combining features, including non-categorical features and feature groups for categorical features, adding and/or subtracting features in dynamic combinations in a series of loops to form at least one feature set, wherein constraints are placed on a minimum and a maximum number of features and feature groups to contain in a feature set, and outputting a number of feature sets with individual features being ranked with respect to one another within each feature set.

27. The system of claim 18, wherein the at least one predictive model further comprises a multiple logistic regression model used to find an equation that best predicts the probability of a value derived from a function of variables indicating predictions for which currencies belong to which job records in the raw data, training dataset and testing dataset.

28. The system of claim 18, wherein second level metrics are calculated from calculations performed against features of the feature sets to explain reasons why anomalous records or jobs were labeled as particular currencies, wherein once calculations are performed on the features sets that were selected to be used with a logistic regression algorithm, wherein second level calculations are used to determine if the predictions made by a logistic regression algorithm yield useable, consistent results, and wherein second level metrics comprise one or more of: detect currency symbols in compensation columns; detect currency abbreviation in compensation columns;
job count as related to geography, job specific and recruitment personnel feature groups; average job counts as related to geography, percentile of base USD amount; percentile of the budget bonus USD amount; and combinations thereof.

29. The system of claim 18, wherein the graphical user interface of the computing device is further configured to automatically generate and display, to the user, results of the predictive model comprising at least one list indicating instances of erroneous data in the raw data presented to the user using a web page, app or other electronic format jobs are linked to predicted currencies with a corresponding listing of potential reasons why the raw data is erroneous and suggested corrections to rectify the raw data and synchronize the raw data including a notification that justifies the suggested corrections using evidence derived from the raw data and test dataset as well as providing, through a graphical user interface, tools for the user to analyze and review potentially erroneous data and accept suggested corrections or other actions synchronizing data, such that the user can manually decide which anomalous jobs are errors, not-errors or unknown, wherein resultant data can then be reprocessed using the method, with potentially new anomalies being detected and old anomalies being tagged as not being anomalies.

30. The system of claim 18, wherein the graphical user interface of the computing device is further configured to display, to the user, results of the predictive model comprising output including at least one of a numerical score, a graphical format, a Venn diagram, a visual aid and a notification, wherein a notification to the user comprises accessing a table in the data storage that has narratives stored and selecting or extracting numbers or values from second level calculations that are inserted into the narratives when thresholds are breached or exceeded, where each narrative of the narratives that is triggered when thresholds are breached or exceeded is inserted and combined into the notification displayed to the user on the graphical user interface with numbers or values inserted into it, for review by the user.

31. A non-transitory computer-readable medium for automatically detecting and rectifying data anomalies to synchronize datasets, the non-transitory computer-readable medium comprising stored electronic instructions that when executed on at least one computing device perform steps comprising:
receiving, using a computing device, raw human resource data from an external source, the raw human resource data including compensation data and storing the received raw human resource data in data storage according to a source data schema;
configuring, using a computing device, the raw human resource data stored in data storage according to a source data schema including currency reduction on the compensation data and storing the configured data in data storage;
processing, using a computing device, the configured data to determine anomalies in in the compensation data using a machine learning predictive model and storing the results in data storage, wherein processing the configured data comprises:
segregating and preparing test datasets and training datasets;
generating and evaluating feature sets comprising extracting relevant content from the transformed data;
fitting, validating, and testing predictive model comprising the steps of:
training a logistic regression model applying machine learning algorithms to the at least one predictive model and calculating model accuracy wherein feature sets are tested in the at least one predictive model for accuracy with respect to results corresponding to the training datasets to create a hierarchy of one or more candidate models wherein the one or more candidate models that produce a highest level of accuracy using training data of the training datasets are selected for use in the at least one predictive model,
wherein accuracy is calculated as a ratio of correctly predicted observation to total observations and wherein a currency model with a highest probability is used for a predicted currency of a row singular currency value is set as a correct value for the training dataset which is fed into logistic regression algorithms to output a number of features sets that are individually applied to the logistic regression algorithms using training data for both the test datasets and training datasets; and
after logistic regression models comprising the at least one predictive model for all relevant currencies have been calculated, the at least one predictive model is fit with test data of the test dataset and the at least one predictive model is run to identify potential errant rows or records in the raw data and test data of the test dataset, wherein training data and test data are applied using a feature set with the highest level of accuracy to the logistic regression model that calculates the features and creates predictions for which currencies belong to which job records, where anomalous predicted currencies for the test data are identified as differentials between predicted currency of the test dataset and currency used in an economic zone and/or currency code, wherein if currency information is not present for both the economic zone and the currency code, a row is tagged as anomalous;
deploying the predictive model and transforming currency data; and
calculating second level metrics using model data; and
generating and displaying, through a graphical user interface of a computing device, the results of the predictive model indicating anomalies in the compensation data stored in the data storage together with potential reasons for anomalies and suggested correction to rectify and synchronize the data.

32. A computer implemented method for automatically detecting and rectifying data anomalies to synchronize datasets, the method comprising:
receiving, using a computing device, raw data from an external data source;
performing data enrichment on the raw data received;
performing deep character level inspection on enriched data;
extracting numerical data from the enriched data;
analyzing the numerical data and performing currency reduction;
calculating first level metrics;
transforming currency data and updating data records with transformed data;
segregating and preparing test datasets and training datasets;
generating and evaluating feature sets comprising extracting relevant content from the transformed data;
fitting, validating and testing a predictive model comprising the steps of:
training a logistic regression model applying machine learning algorithms to the at least one predictive model and calculating model accuracy wherein feature sets are tested in the at least one predictive model for accuracy with respect to results corresponding to the training datasets to create a hierarchy of one or more candidate models wherein the one or more candidate models that produce a highest level of accuracy using training data of the training datasets are selected for use in the at least one predictive model,
wherein accuracy is calculated as a ratio of correctly predicted observation to total observations and wherein a currency model with a highest probability is used for a predicted currency of a row singular currency value is set as a correct value for the training dataset which is fed into logistic regression algorithms to output a number of features sets that are individually applied to the logistic regression algorithms using training data for both the test datasets and training datasets; and
after logistic regression models comprising the at least one predictive model for all relevant currencies have been calculated, the at least one predictive model is fit with test data of the test dataset and the at least one predictive model is run to identify potential errant rows or records in the raw data and test data of the test dataset, wherein training data and test data are applied using a feature set with the highest level of accuracy to the logistic regression model that calculates the features and creates predictions for which currencies belong to which job records, where anomalous predicted currencies for the test data are identified as differentials between predicted currency of the test dataset and currency used in an economic zone and/or currency code, wherein if currency information is not present for both the economic zone and the currency code, a row is tagged as anomalous;
deploying the predictive model and transforming currency data;
calculating second level metrics using model data; and
automatically generating and presenting, to a user, through a graphical user interface, results of the predictive model deployed in a displayable format for further end user remediation comprising indicating instances of erroneous data in the raw data together with a corresponding listing of potential reasons why the raw data is erroneous, and suggested corrections to rectify the raw data and synchronize the raw data.

33. A system for automatically detecting and rectifying data anomalies to synchronize datasets, the system comprising:
one or more databases or distributed file systems communicating over an electronic network and configured for data storage,
a computing device comprising one or more processors, memory, programmable instructions or applications, machine learning algorithm modules calculation engines, and at least one operating system (OS), and configured to:
receive raw data from an external data source;
perform data enrichment on the raw data received;
perform deep character level inspection on enriched data;
extract numerical data from the enriched data;
analyze the numerical data and perform currency reduction;
calculate first level metrics;
transform currency data and updating data records with transformed data;
segregate and prepare test datasets and training datasets;
generate and evaluate feature sets comprising extracting relevant content from the transformed data;
fit, validate and test a predictive model comprising the steps of:
training a logistic regression model applying machine learning algorithms to the at least one predictive model and calculating model accuracy wherein feature sets are tested in the at least one predictive model for accuracy with respect to results corresponding to the training datasets to create a hierarchy of one or more candidate models wherein the one or more candidate models that produce a highest level of accuracy using training data of the training datasets are selected for use in the at least one predictive model,
wherein accuracy is calculated as a ratio of correctly predicted observation to total observations and wherein a currency model with a highest probability is used for a predicted currency of a row singular currency value is set as a correct value for the training dataset which is fed into logistic regression algorithms to output a number of features sets that are individually applied to the logistic regression algorithms using training data for both the test datasets and training datasets; and after logistic regression models comprising the at least one predictive model for all relevant currencies have been calculated, the at least one predictive model is fit with test data of the test dataset and the at least one predictive model is run to identify potential errant rows or records in the raw data and test data of the test dataset, wherein training data and test data are applied using a feature set with the highest level of accuracy to the logistic regression model that calculates the features and creates predictions for which currencies belong to which job records, where anomalous predicted currencies for the test data are identified as differentials between predicted currency of the test dataset and currency used in an economic zone and/or currency code, wherein if currency information is not present for both the economic zone and the currency code, a row is tagged as anomalous;

deploy the predictive model to transform currency data;

calculate second level metrics using model data; and a graphical user interface configured to automatically generate and present, to a user, results of the predictive model deployed in a displayable format for further end user remediation comprising a list indicating instances of erroneous data in the raw data together with a corresponding listing of potential reasons why the raw data is erroneous, and suggested corrections to rectify the raw data and synchronize the raw data.

34. A non-transitory computer-readable medium for automatically detecting and rectifying data anomalies to synchronize datasets, the non-transitory computer-readable medium comprising stored electronic instructions that when executed on at least one computing device perform steps comprising:

receiving, using the at least one computing device, raw data from a data source;

performing data enrichment on the raw data received;

performing deep character level inspection on enriched data;

extracting numerical data from the enriched data;

analyzing the numerical data and performing currency reduction;

calculating first level metrics;

transforming currency data and updating data records with transformed data;

segregating and preparing test datasets and training datasets;

generating and evaluating feature sets comprising extracting relevant content from the transformed data;

fitting, validating and testing a predictive model comprising the steps of:

training a logistic regression model applying machine learning algorithms to the at least one predictive model and calculating model accuracy wherein feature sets are tested in the at least one predictive model for accuracy with respect to results corresponding to the training datasets to create a hierarchy of one or more candidate models wherein the one or more candidate models that produce a highest level of accuracy using training data of the training datasets are selected for use in the at least one predictive model, wherein accuracy is calculated as a ratio of correctly predicted observation to total observations and wherein a currency model with a highest probability is used for a predicted currency of a row singular currency value is set as a correct value for the training dataset which is fed into logistic regression algorithms to output a number of features sets that are individually applied to the logistic regression algorithms using training data for both the test datasets and training datasets; and after logistic regression models comprising the at least one predictive model for all relevant currencies have been calculated, the at least one predictive model is fit with test data of the test dataset and the at least one predictive model is run to identify potential errant rows or records in the raw data and test data of the test dataset, wherein training data and test data are applied using a feature set with the highest level of accuracy to the logistic regression model that calculates the features and creates predictions for which currencies belong to which job records, where anomalous predicted currencies for the test data are identified as differentials between predicted currency of the test dataset and currency used in an economic zone and/or currency code, wherein if currency information is not present for both the economic zone and the currency code, a row is tagged as anomalous;

deploying the predictive model and transforming currency data;

calculating second level metrics using model data; and automatically generating and presenting, to a user, through a graphical user interface, results of the predictive model deployed in a displayable format for further end user remediation comprising a list indicating instances of erroneous data in the raw data together with a corresponding listing of potential reasons why the raw data is erroneous, and suggested corrections to rectify the raw data and synchronize the raw data.

\* \* \* \* \*

UNITED STATES PATENT AND TRADEMARK OFFICE
CERTIFICATE OF CORRECTION

PATENT NO. : 11,636,418 B2
APPLICATION NO. : 16/902944
DATED : April 25, 2023
INVENTOR(S) : William M. Lyerly et al.

Page 1 of 1

It is certified that error appears in the above-identified patent and that said Letters Patent is hereby corrected as shown below:

In the Claims

Column 34, Claim 14, Line 26, delete "2" and insert --1--.

Signed and Sealed this
Twenty-fifth Day of July, 2023

Katherine Kelly Vidal
*Director of the United States Patent and Trademark Office*